US012189329B2

(12) United States Patent
Tezuka

(10) Patent No.: US 12,189,329 B2
(45) Date of Patent: Jan. 7, 2025

(54) IMAGE FORMING APPARATUS

(71) Applicant: CANON KABUSHIKI KAISHA, Tokyo (JP)

(72) Inventor: Shuntaro Tezuka, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/454,390

(22) Filed: Aug. 23, 2023

(65) Prior Publication Data

US 2024/0069487 A1 Feb. 29, 2024

(30) Foreign Application Priority Data

Aug. 25, 2022 (JP) ................................ 2022-133796

(51) Int. Cl.
*G03G 21/16* (2006.01)
*G03G 15/16* (2006.01)

(52) U.S. Cl.
CPC ..... *G03G 21/1647* (2013.01); *G03G 15/1605* (2013.01); *G03G 2221/1642* (2013.01); *G03G 2221/1654* (2013.01)

(58) Field of Classification Search
CPC ....... G03G 15/1685; G03G 2221/1642; G03G 15/1605; G03G 21/1647; G03G 21/1825; G03G 21/1676; G03G 21/168; G03G 15/167
See application file for complete search history.

(56) References Cited

U.S. PATENT DOCUMENTS

| | | | | |
|---|---|---|---|---|
| 5,923,935 A * | 7/1999 | Yamaguchi | G03G 21/168 | 399/21 |
| 2007/0253730 A1* | 11/2007 | Matsubara | G03G 15/1685 | 399/121 |
| 2009/0022514 A1* | 1/2009 | Fujiwara | G03G 21/168 | 399/121 |

FOREIGN PATENT DOCUMENTS

| | | |
|---|---|---|
| JP | 2005345565 A | 12/2005 |
| JP | 2006072395 A | 3/2006 |
| JP | 2015043039 A | 3/2015 |

* cited by examiner

*Primary Examiner* — Jessica L Eley
(74) *Attorney, Agent, or Firm* — Canon U.S.A., Inc. IP Division

(57) ABSTRACT

An image forming apparatus includes an apparatus main body, an image bearing member unit, a transfer member, a supporting member, and a positioning member. The image bearing member unit and the transfer member are disposed attachable to and detachable from the apparatus main body. The supporting member includes a to-be-contacted portion configured to be in contact with a to-contact portion of the image bearing member unit. The to-be-contacted portion is movable from a first position to a second position by an attachment operation of the image bearing member unit to the apparatus main body, where the first position is a position to be in contact with the to-contact portion, the second position is a position different from the first position, and the second position is a position at which the supporting member is supported by the positioning member and the to-be-contacted portion is out of contact with the to-contact portion.

11 Claims, 19 Drawing Sheets

IMAGE FORMING APPARATUS

BACKGROUND

Field

The present disclosure relates to an electrophotographic image forming apparatus, such as a copier or a printer.

Description of the Related Art

Image forming apparatuses using an electrophotographic image forming process form images on recording materials, such as sheets, through the following process. First, an electrostatic latent image is formed on a photosensitive member serving as an image bearing member, the latent image is developed with a developer to be visualized as a toner image, and the toner image is transferred onto a recording material at a transfer nip portion formed between the photosensitive member and a transfer member. Thereafter, the recording material on which the toner image is transferred is nipped and conveyed at a fixing nip portion formed between a fixing roller and a pressure roller included in the fixing device, so that the toner image is heated and fixed on the recording material. In this manner, the image is formed on the recording material.

There is known a configuration of such an image forming apparatus to and from which a process cartridge integrally configured of a photosensitive member and devices arranged around the photosensitive member is attachable and detachable. On the other hand, a transfer roller has a longer life than components used in the process cartridge, so that the transfer roller is typically disposed on the main body of the image forming apparatus. There are, however, other cases in which a transfer roller is configured to be attachable to and detachable from the main body of an image forming apparatus so as to be replaced with another as appropriate.

For example, Japanese Patent Application Laid-Open No. 2006-072395 discusses a configuration in which an integrated unit configured of a transfer roller and a bearing member that axially supports the transfer roller can be attached to and detached from a bearing attachment portion included in the main body of an image forming apparatus.

SUMMARY

The present disclosure is directed to providing a novel attachment/detachment configuration of a transfer member in an image forming apparatus including an attachable-detachable transfer member.

According to an aspect of the present disclosure, an image forming apparatus includes an apparatus main body, an image bearing member unit disposed attachable to and detachable from the apparatus main body and including an image bearing member for bearing a toner image, a transfer member disposed attachable to and detachable from the apparatus main body and configured to transfer the toner image borne on the image bearing member onto a recording material, a supporting member disposed at one end side of a shaft portion of the transfer member in an axial direction of the transfer member and configured to rotatably support the shaft portion of the transfer member, wherein the supporting member includes a to-be-contacted portion configured to be in contact with a to-contact portion of the image bearing member unit, and a positioning member configured to position the supporting member with respect to the apparatus main body, wherein the to-be-contacted portion is movable from a first position to a second position by an attachment operation of the image bearing member unit to the apparatus main body, where the first position is a position to be in contact with the to-contact portion, the second position is a position different from the first position, and the second position is a position at which the supporting member is supported by the positioning member and the to-be-contacted portion is out of contact with the to-contact portion.

Further features of the present disclosure will become apparent from the following description of exemplary embodiments with reference to the attached drawings.

DESCRIPTION OF THE EMBODIMENTS

Hereinafter, exemplary embodiments of the present disclosure will be described in detail with reference to the drawings. However, dimensions, materials, shapes, relative arrangements, and the like of components described in the following exemplary embodiments should be appropriately changed according to a configuration and various conditions of an apparatus to which the present disclosure is applied, and therefore, are not intended to limit the scope of the present disclosure unless otherwise specified.

[Image Forming Apparatus]

Figure 1:
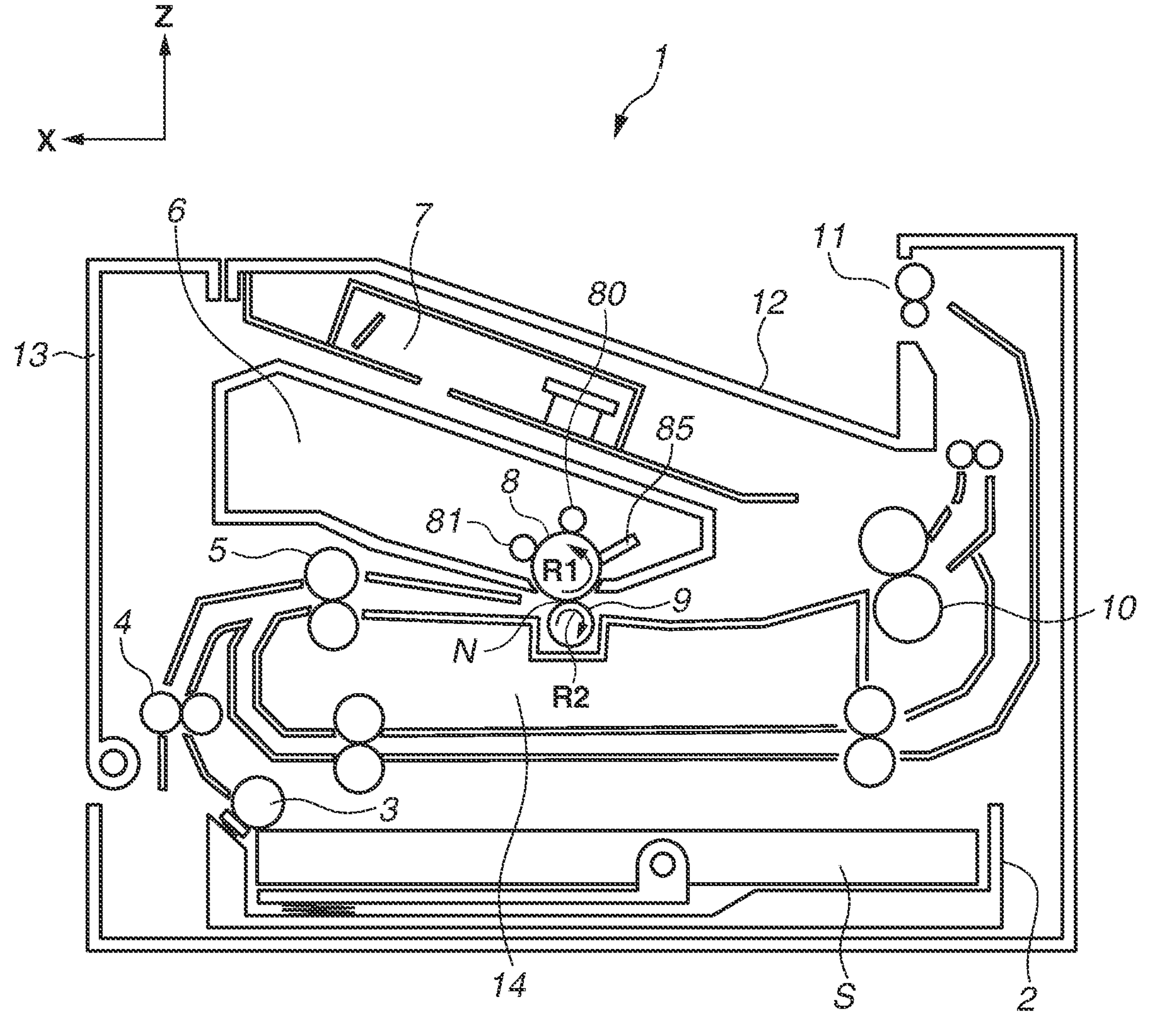
FIG. 1 is a schematic cross-sectional view illustrating an example of an image forming apparatus.

FIG. 1 is a schematic cross-sectional view illustrating an example of an image forming apparatus 1 according to a first exemplary embodiment. As illustrated in FIG. 1, the image forming apparatus 1 (hereinafter, sometimes referred to as an apparatus main body 1) includes a drum-type electrophotographic photosensitive member 8 (hereinafter referred to as a photosensitive drum 8) as an image bearing member. The photosensitive drum 8 is composed of a photosensitive agent of, for example, organic photo semiconductor (OPC), amorphous selenium, or amorphous silicon, on a cylindrical drum base formed of, for example, aluminum or nickel. The photosensitive drum 8 is rotatably supported by the apparatus main body 1, and is rotationally driven by a driving source at a predetermined speed in the direction indicated by an arrow R1 in FIG. 1. Around the photosensitive drum 8, a charging member 80 and a developing member 81 are disposed in this order in the R1 direction as a rotational direction of the photosensitive drum 8. A cleaning member 85 is disposed downstream of the position at which a transfer roller 9 and the photosensitive drum 8, which will be described below, are in contact with each other, and upstream of the charging member 80, in the R1 direction. The photosensitive drum 8, the charging member 80, the developing member 81, and the cleaning member 85 integrally constitute a process cartridge 6, which is attachable to and detachable from the apparatus main body 1.

Further, the transfer roller 9 as a transfer member is disposed below the photosensitive drum 8 in the gravity direction, and is in contact with the photosensitive drum 8 to form a transfer nip N. In the present exemplary embodiment, the transfer roller 9 is rotationally driven by the rotation of the photosensitive drum 8 in the direction indicated by an arrow R2. In addition, the transfer roller 9 is configured to be attachable to and detachable from the apparatus main body 1, and more specifically, is configured to be attachable to and detachable from a frame member 14 as a frame of the apparatus main body 1. A scanner unit 7 serving as an exposure unit is disposed above the photosensitive drum 8 in the gravity direction.

As other components, the image forming apparatus 1 includes, for example, a sheet feed cassette 2 in which a recording material S of paper is put, a sheet feeding roller 3, a conveying roller 4, a registration roller 5, a fixing unit 10, a discharge roller 11, and a discharge tray 12 in this order along a conveyance path of the recording material S.

[Operation of Image Forming System]

An image forming operation performed by the image forming apparatus 1 will be described. The image forming apparatus 1 starts an image formation on the recording material S, such as a recording sheet or an overhead projector (OHP) sheet, in an electrophotographic method, based on a signal transmitted from an external device, such as a computer, communicably connected to the image forming apparatus 1.

The photosensitive drum 8 being rotationally driven by a driving source (not illustrated) is uniformly charged to a predetermined polarity and a predetermined potential by the charging member 80. The charged surface of the photosensitive drum 8 is subjected to image exposure based on image information by the scanner unit 7, and the charge of the exposed portions is removed to form an electrostatic latent image. The electrostatic latent image is developed with toner as a developer carried on the developing member 81, and a toner image is formed on the photosensitive drum 8.

In parallel with the above-described image forming process, the recording material S is fed from the sheet feed cassette 2 toward the transfer nip N by the rotation of the sheet feeding roller 3. The fed recording material S is conveyed to the registration roller 5 by the conveying roller 4, and then is conveyed to the transfer nip N, which is a nip portion between the photosensitive drum 8 and the transfer roller 9, in synchronism with the toner image on the photosensitive drum 8. The transfer roller 9 performs a transfer operation of transferring the toner image on the photosensitive drum 8 (on the image bearing member) onto the recording material S at the transfer nip N.

The unfixed toner image transferred from the photosensitive drum 8 onto the recording material S at the transfer nip N is heated and fixed to the recording material S by the fixing unit 10 after the recording material S reaches the fixing unit 10 in the conveyance. Thereafter, the recording material S that has passed through the fixing unit 10 is discharged onto the discharge tray 12 by the discharge roller 11.

[Configuration of Transfer Unit]

Figure 2:
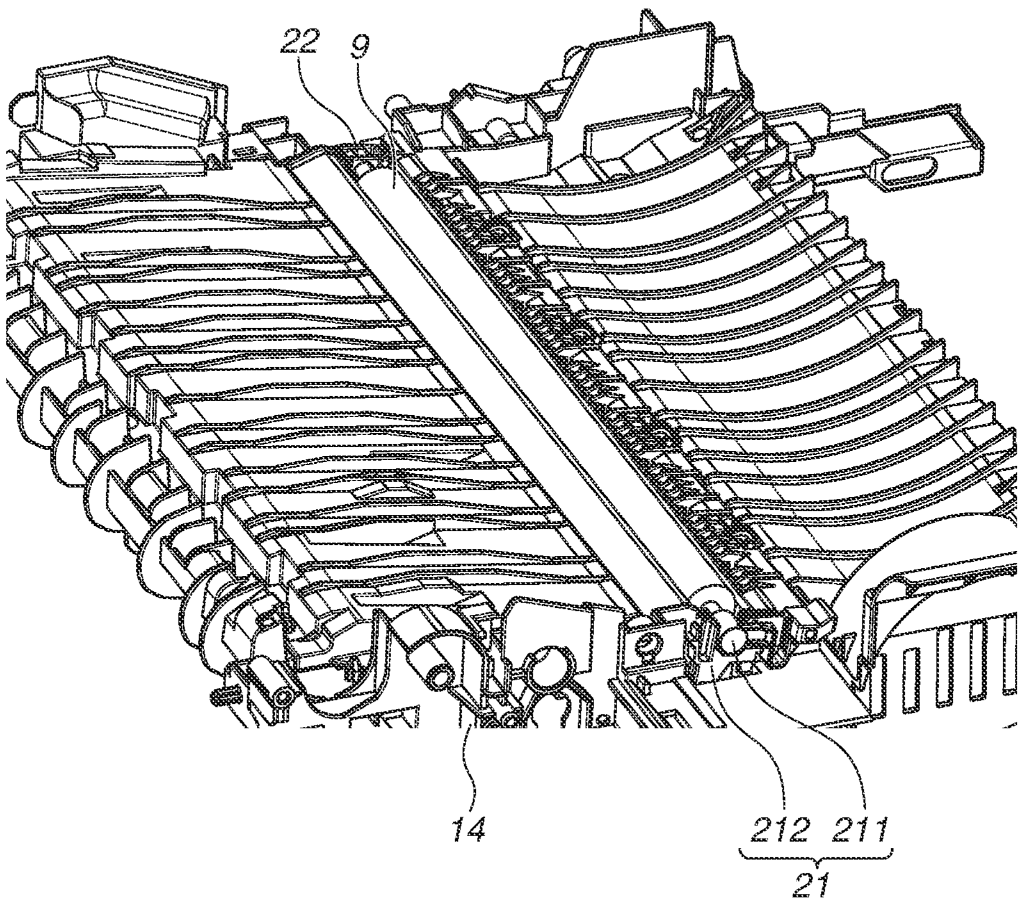
FIG. 2 is a schematic perspective view of the vicinity of a transfer member according to a first exemplary embodiment.
Figure 3:
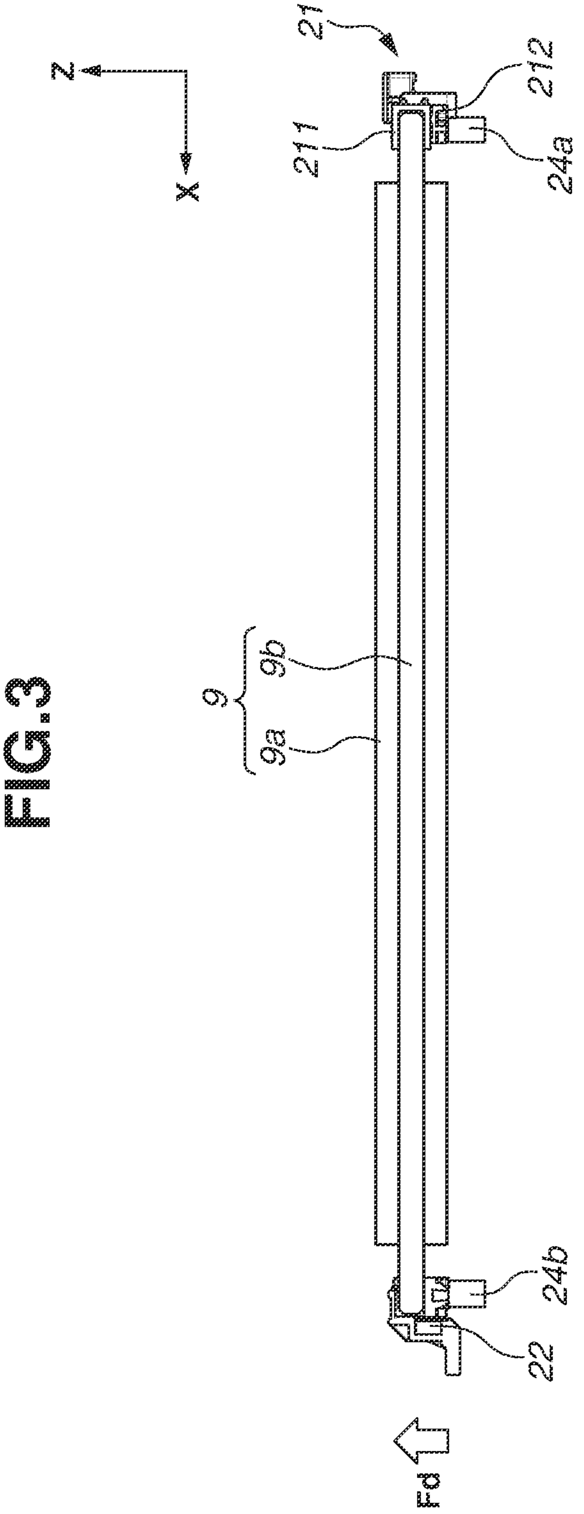
FIG. 3 is a schematic cross-sectional view of the transfer member according to the first exemplary embodiment.
Figure 4:
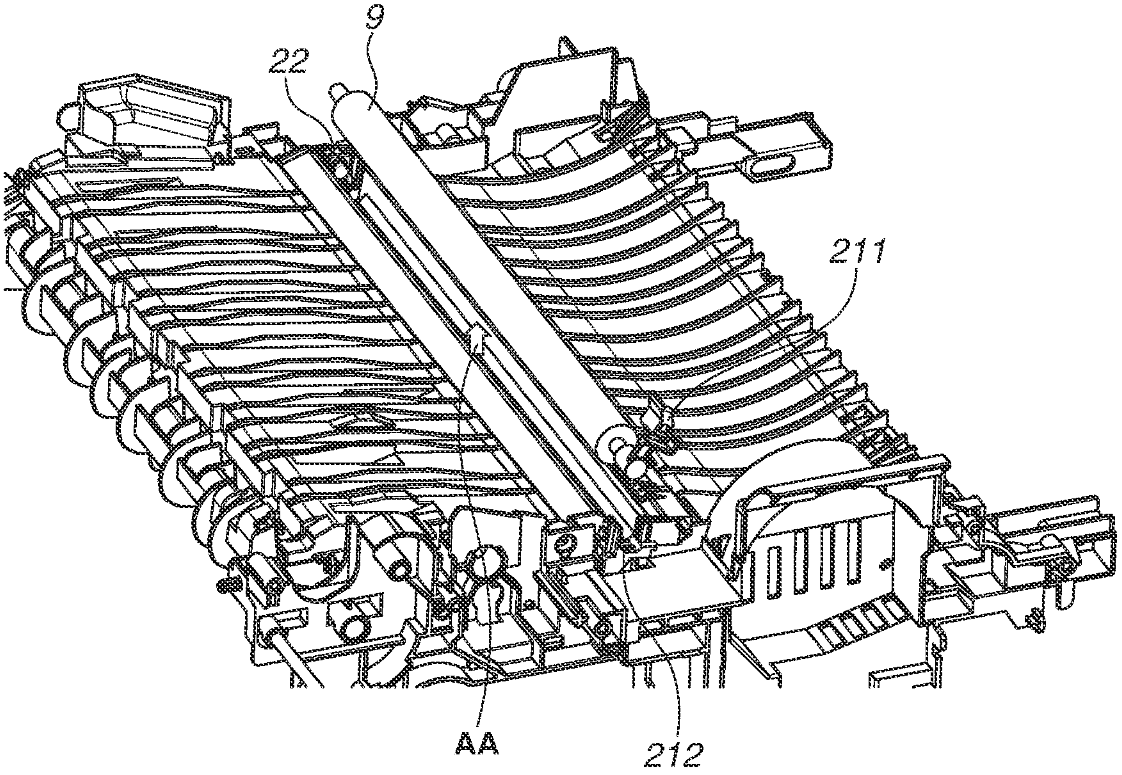
FIG. 4 is a schematic perspective view illustrating a state where the transfer member according to the first exemplary embodiment is detached from a frame member.

The configuration of a transfer unit will now be described with reference to FIGS. 2 to 4. FIG. 2 is a schematic perspective view of the vicinity of the transfer roller 9 in the present exemplary embodiment. FIG. 3 is a schematic cross-sectional view of the transfer roller 9 attached to the apparatus main body 1, as viewed from a direction perpendicular to a direction of a rotational axis of the transfer roller 9. FIG. 4 is a schematic perspective view illustrating a state in which the transfer roller 9 is detached from the apparatus main body 1.

As illustrated in FIGS. 2 and 3, the transfer roller 9 includes a roller portion 9*a* and a shaft portion 9*b* as a rotational shaft of the transfer roller 9, the shaft portion 9*b* having both end portions in the rotational axis direction, the end portions protruding from the roller portion 9*a*. Further, with the transfer roller 9 attached to the apparatus main body 1, one end portion of the transfer roller 9 in the rotational axis direction is rotatably supported by a bearing member 21, and the other end portion opposite to the one end portion is rotatably supported by a bearing member 22.

The bearing member 21 and the bearing member 22 are supported by a transfer member supporting portion (not illustrated) of the frame member 14 so that the transfer roller 9 is movable in a direction in which the transfer roller 9 is detached from the apparatus main body 1 (arrow AA direction illustrated in FIG. 4). The bearing member 21 includes a supporting member 211 for supporting one end portion of the shaft portion 9*b* of the transfer roller 9, and a positioning member 212 for positioning the supporting member 211 together with the transfer roller 9 with respect to the apparatus main body 1 (hereinafter, described as the frame member 14). As illustrated in FIG. 4, in the present exemplary embodiment, the transfer roller 9, together with the supporting member 211, is attachable to and detachable from the frame member 14. Further, the positioning member 212 is fixed to the frame member 14. When the transfer roller 9 is detached from the frame member 14, the supporting member 211 of the bearing member 21 is separated from the positioning member 212, and the transfer roller 9 is detached in a state in which the supporting member 211 is mounted on the shaft portion 9*b* of the transfer roller 9.

In the present exemplary embodiment, with such a configuration, a user can perform an attachment/detachment operation of the transfer roller 9 by grasping the supporting member 211 as a handle. Further, the transfer roller 9 can be detached from the frame member 14 regardless of whether the transfer roller 9 is separated from or in contact with the photosensitive drum 8 by a transfer separation mechanism to be described below.

Attachment operations of the transfer roller 9 and the process cartridge 6 will now be described.

[Description of Attachment Operation of Transfer Roller]

Figure 5A:
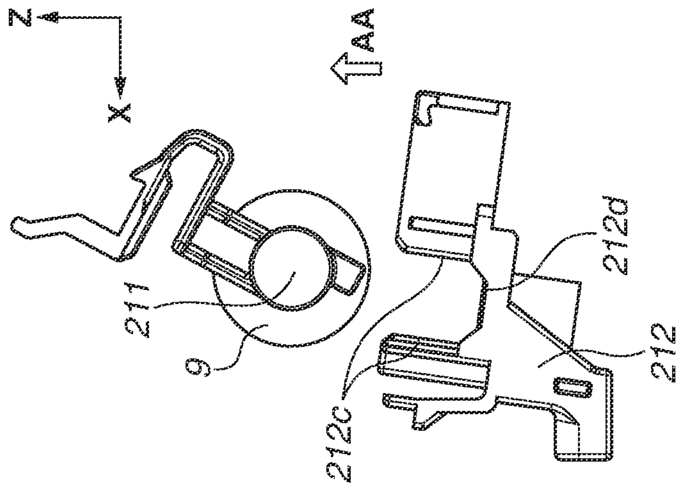
FIGS. 5A to 5C schematically illustrate attachment of the transfer member according to the first exemplary embodiment.
Figure 5B:
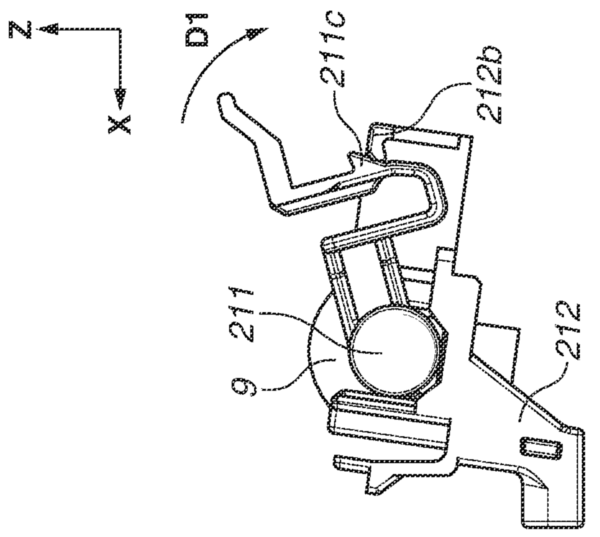
Figure 5C:
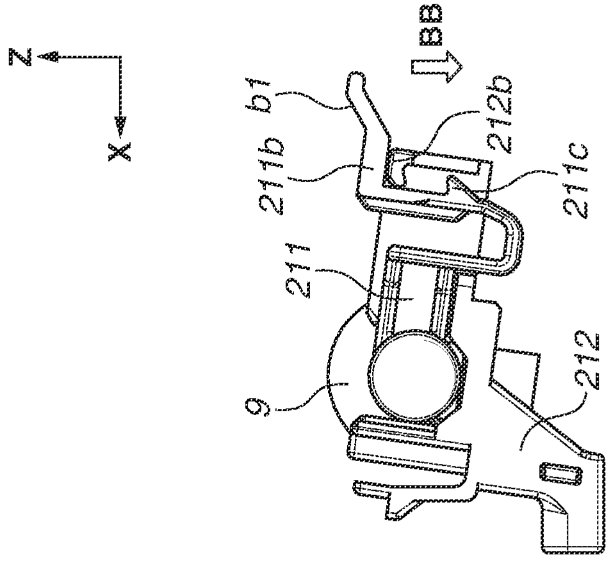

First, the attachment operation of the transfer roller 9 will be described with reference to FIGS. 5A to 5C. FIG. 5A schematically illustrates a state where the transfer roller 9 and the supporting member 211 are detached from the frame member 14. FIG. 5B schematically illustrates a state (first state) in which the transfer roller 9 and the supporting member 211 are supported by the positioning member 212. FIG. 5C schematically illustrates a state (second state) in which the transfer roller 9 and the supporting member 211 are attached to the frame member 14.

As illustrated in FIG. 5A, the positioning member 212 has a seat surface portion 212*d* which supports a lower surface portion of the supporting member 211 in the gravity direction, and side surface portions 212*c* which are two surfaces facing each other with the seat surface portion 212*d* interposed therebetween. The first state illustrated in FIG. 5B is a state in which the supporting member 211 is supported by the positioning member 212, but a hook portion 211*c* alone of the supporting member 211 is in contact with (placed on) a restraining portion 212*b* of the positioning member 212. In other words, in the first state illustrated in FIG. 5B, the supporting member 211 is supported by the positioning member 212, but can be easily detached by a user or the like. The second state illustrated in FIG. 5C is a state in which the supporting member 211 is elastically deformed by receiving an external force and is rotated in the direction of an arrow D1 in FIG. 5B (details will be described below), and thus the hook portion 211*c* is moved in the direction of an arrow BB in FIG. 5C and climbs over the restraining portion 212*b*. The second state is a state in which the supporting member 211 can be positioned with respect to the frame member 14 by the positioning member 212. Although details will be described below, in the present exemplary embodiment, the second state is defined as a state in which the transfer roller 9 is completely attached to the frame member 14 (i.e., the apparatus main body 1).

[Description of Attachment Operation of Process Cartridge]

Figure 6:
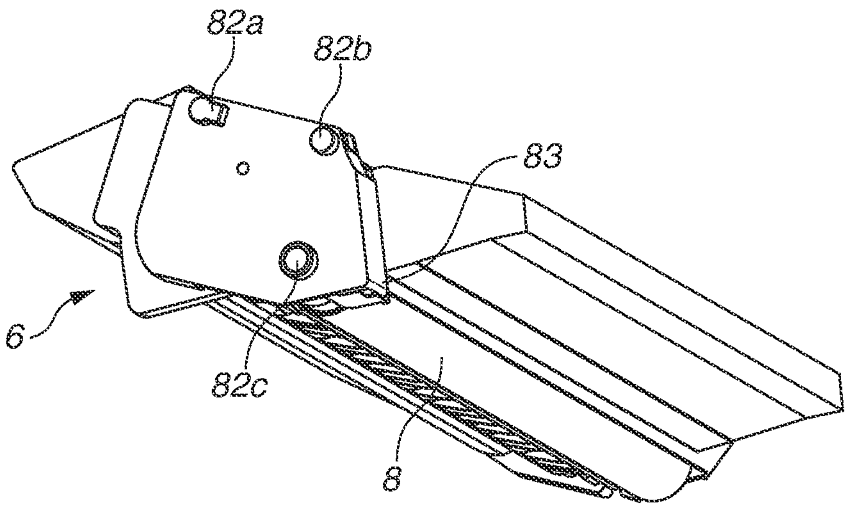
FIG. 6 is a schematic perspective view of a process cartridge according to the first exemplary embodiment.
Figure 7:
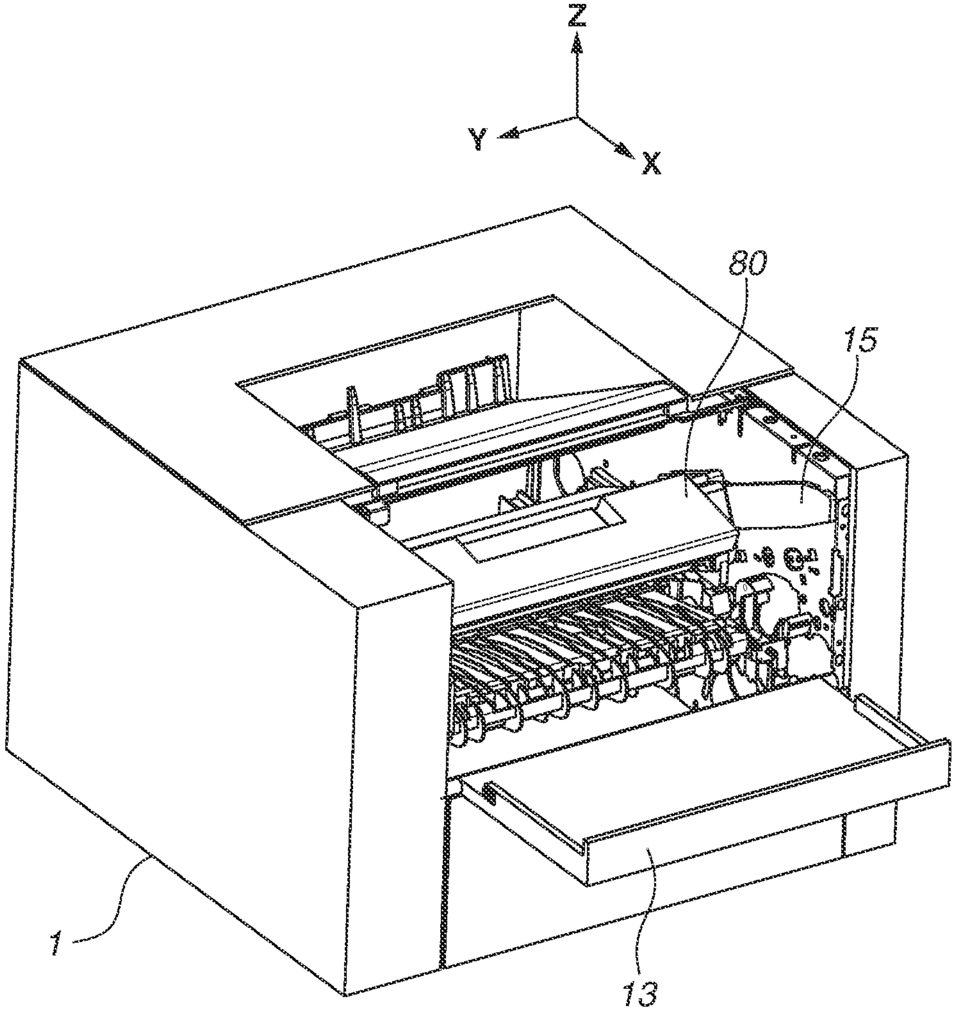
FIG. 7 schematically illustrates the image forming apparatus according to the first exemplary embodiment with an openable door opened.
Figure 8:
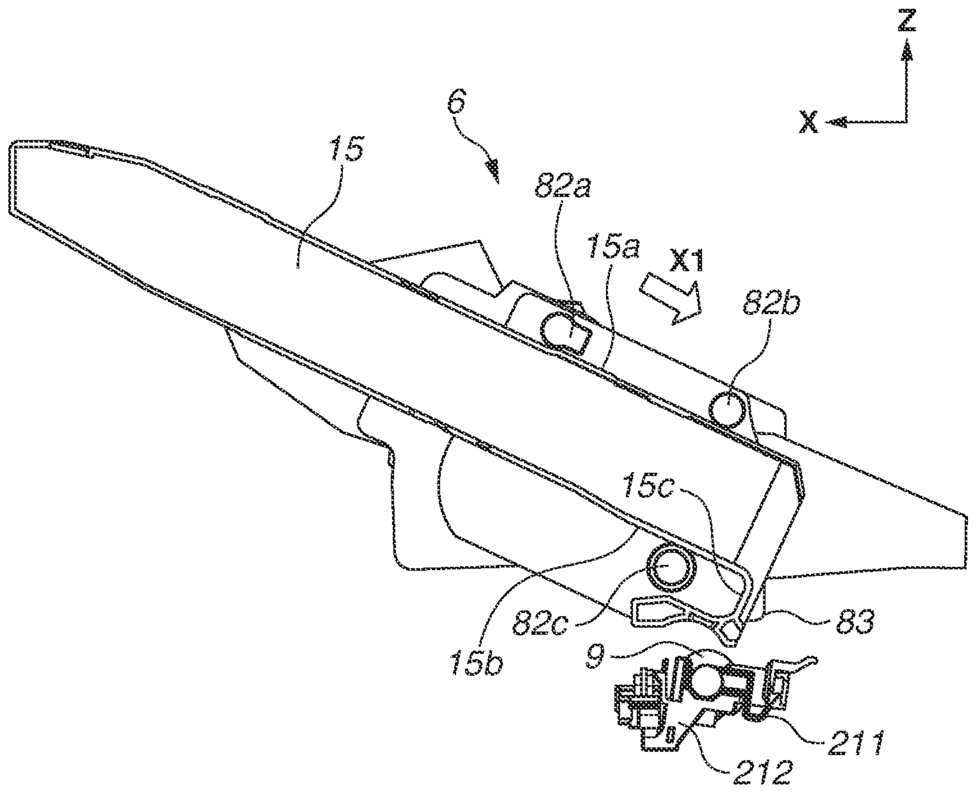
FIG. 8 schematically illustrates a process cartridge attachment operation according to the first exemplary embodiment.

The attachment operation of the process cartridge 6 will now be described with reference to FIGS. 6 to 8. FIG. 6 is a schematic perspective view of the process cartridge 6. FIG. 7 schematically illustrates the image forming apparatus in a state in which a door 13 that is openable and closable is opened. FIG. 8 illustrates the attachment operation of the process cartridge 6.

As illustrated in FIG. 6, in the orientation of the process cartridge 6 that is attached to the apparatus main body 1, the photosensitive drum 8 is disposed on the bottom side of the process cartridge 6 in the gravity direction. Further, on a side surface (end surface in the rotational axis direction of the photosensitive drum 8) of the process cartridge 6, guide bosses 82*a*, 82*b*, and 82*c* for attaching the process cartridge 6 to the apparatus main body 1 are provided. Further, the process cartridge 6 includes a to-contact portion 83 that can be in contact with the supporting member 211 of the bearing member 21 downstream in the attaching direction of the process cartridge 6 to the apparatus main body 1 with the orientation of the process cartridge 6 attached to the apparatus main body 1. The configuration of the to-contact portion 83 will be described below in detail.

As illustrated in FIGS. 7 and 8, the process cartridge 6 can be attached to and detached from the apparatus main body 1 through an opening created by the door 13 (opening and closing member) being opened, the opening allowing the access to the inside of the image forming apparatus. More specifically, the process cartridge 6 is attached in such a manner that the guide bosses 82*a*, 82*b*, and 82*c* move along a guide member 15 included in the apparatus main body 1. The guide member 15 forms a shape protruding from a side surface of the image forming apparatus 1 (a surface parallel to a surface orthogonal to the rotational axis direction of the photosensitive drum 8) toward the inside of the image forming apparatus. Further, the guide member 15 has an upper surface 15*a* which supports the guide bosses 82*a* and 82*b*, and a lower surface 15*b* which comes into contact with the guide boss 82*c* and restrains upward movement of the process cartridge 6 in the gravity direction while the process cartridge 6 is being attached. Further, the guide member 15 includes a to-be-abutted portion 15*c* which the guide boss 82*c* abuts and is in contact with to position the process cartridge 6 in a state in which the process cartridge 6 is completely attached to the apparatus main body 1. With the process cartridge 6 attached to the apparatus main body 1, the to-be-abutted portion 15*c* is disposed downstream of the guide boss 82*c* in the direction of an arrow X1 in FIG. 8 as the attaching direction of the process cartridge 6.

Here, an operation in which the supporting member 211 is shifted from the first state to the second state by the attachment of the process cartridge 6 will be described with reference to FIGS. 9, 10A, and 10B.

Figure 9:
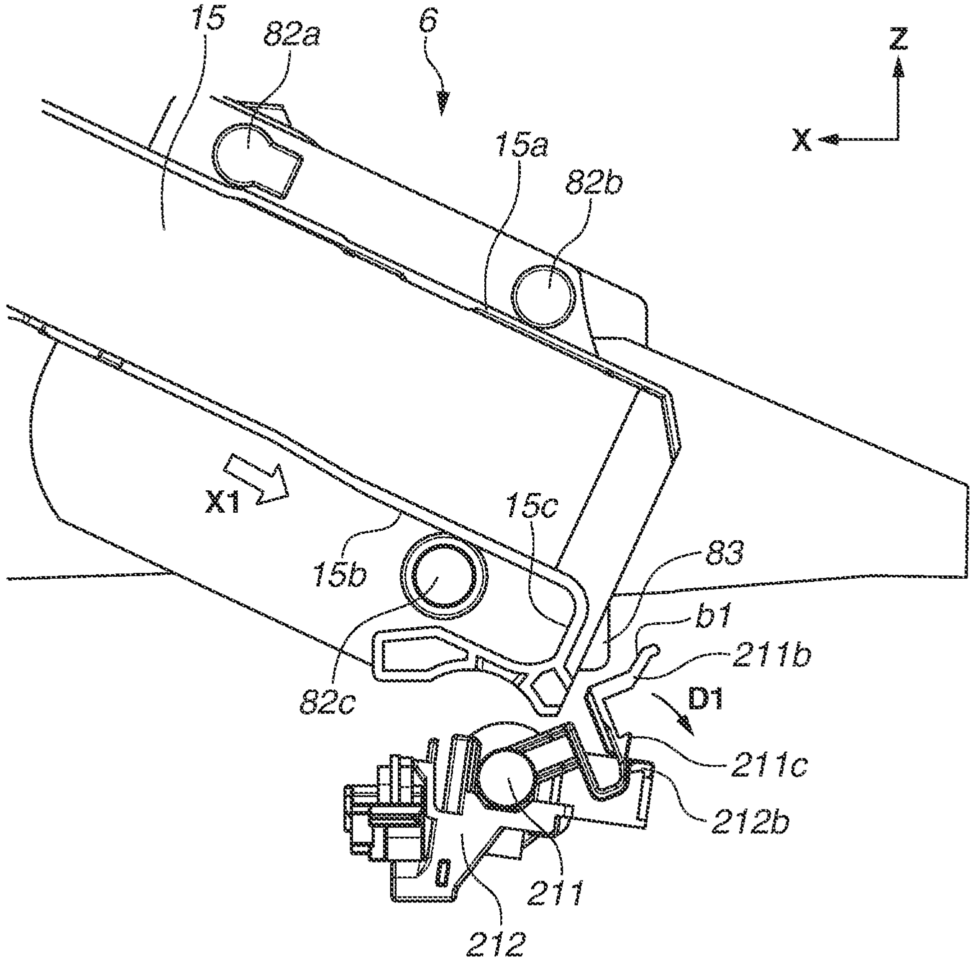
FIG. 9 schematically illustrates a supporting member in a first state according to the first exemplary embodiment.

FIG. 9 schematically illustrates the supporting member 211 in the first state before the process cartridge 6 is completely attached to the apparatus main body 1. As illustrated in FIG. 9, the process cartridge 6 includes the to-contact portion 83 that can contact a to-be-contacted portion 211*b* provided on the bearing member 21. Further, the direction of the arrow X1 in FIG. 9 indicates the moving direction (attaching direction) when the process cartridge 6 is attached to the apparatus main body 1. In FIG. 9, the process cartridge 6 is moving in a lower right direction.

As illustrated in FIG. 9, the supporting member 211 includes the to-be-contacted portion 211*b* at a position where the to-contact portion 83 comes into contact with the to-be-contacted portion 211*b* in a locus where the process cartridge 6 is attached in the first state. The position of the to-be-contacted portion 211*b* at this time is defined as a first position. Further, the to-be-contacted portion 211*b* has a to-be-contacted surface b1 that can contact the to-contact portion 83 of the process cartridge 6 at the first position.

With the attachment operation of the process cartridge 6, the to-be-contacted portion 211*b* is pushed downward in the gravity direction by the to-contact portion 83 in contact with the to-be-contacted surface b1. At this time, the to-be-contacted portion 211*b* is bent by a pressing force of the to-contact portion 83, so that the hook portion 211*c* climbs over the restraining portion 212*b* and further moves in the direction of the arrow D1 in FIG. 9.

Figure 10A:
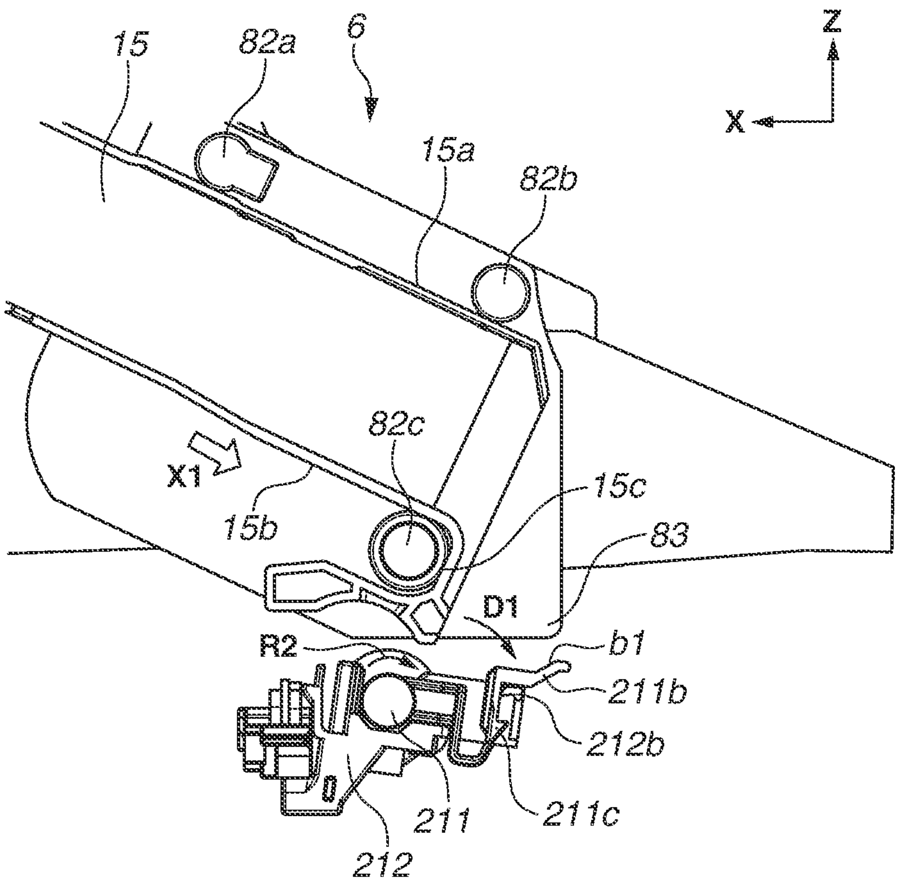
FIGS. 10A and 10B schematically illustrate the supporting member in a second state according to the first exemplary embodiment.

FIG. 10A schematically illustrates the supporting member 211 in the second state in which the process cartridge 6 is attached at a predetermined attachment position. As illustrated in FIG. 10A, the process cartridge 6 is positioned in a state where the guide boss 82*c* is in contact with the to-be-abutted portion 15*c* of the guide member 15 at the predetermined attachment position. After climbing over the restraining portion 212*b* of the positioning member 212, the supporting member 211 is rotated in the direction of the arrow D1 (D1 direction) by its own weight, and is moved to a position where the supporting member 211 is out of contact with the to-contact portion 83. The position of the to-be-contacted portion 211*b* at this time is defined as a second position. The to-be-contacted portion 211*b* shifted from the first position to the second position by the movement in the D1 direction by its own weight after being pushed by the to-contact portion 83 is supported by the restraining portion 212*b* of the positioning member 212 as illustrated in FIG. 10A, and the rotational position in the D1 direction is restricted. Thus, the supporting member 211 is supported by the positioning member 212, and the transfer roller 9, together with the supporting member 211, is positioned with respect to the frame member 14.

When the apparatus main body 1 is being operated, the transfer roller 9 is rotationally driven in the direction indicated by the arrow R2 by the rotation of the photosensitive drum 8. In this state, the supporting member 211 of the bearing member 21 similarly receives a force in the D1 direction due to a friction force received from the shaft portion of the transfer roller 9. At this time, the to-be-contacted portion 211*b* is brought into contact with the restraining portion 212*b*, whereby the movement of the to-be-contacted portion 211*b* in the direction of the arrow D1 is restrained. As a result, the supporting member 211 is stabilized in an orientation (second state) in FIG. 10A. The movement in the direction from the second position to the first position is restrained by the hook portion 211*c* coming into contact with the lower surface of the restraining portion 212*b*.

The shape of the to-contact portion 83 is not limited thereto. As long as the to-be-contacted portion 211*b* can be moved (pressed) with the movement of the process cartridge 6, another shape may be employed. However, in FIG. 10A, a to-contact surface of the to-contact portion 83 that is to come into contact with the to-be-contacted portion 211*b* forms a curved shape. In other words, the edge of the to-contact portion 83 before and after a to-contact point of the to-contact portion 83 with respect to the to-be-contacted portion 211*b* is curved as seen in the axial direction of the transfer roller 9. Thus, even while the process cartridge 6 is moving in the direction indicated by the arrow X1, the to-contact portion 83 can smoothly move the to-be-contacted portion 211*b*.

Figure 10B:
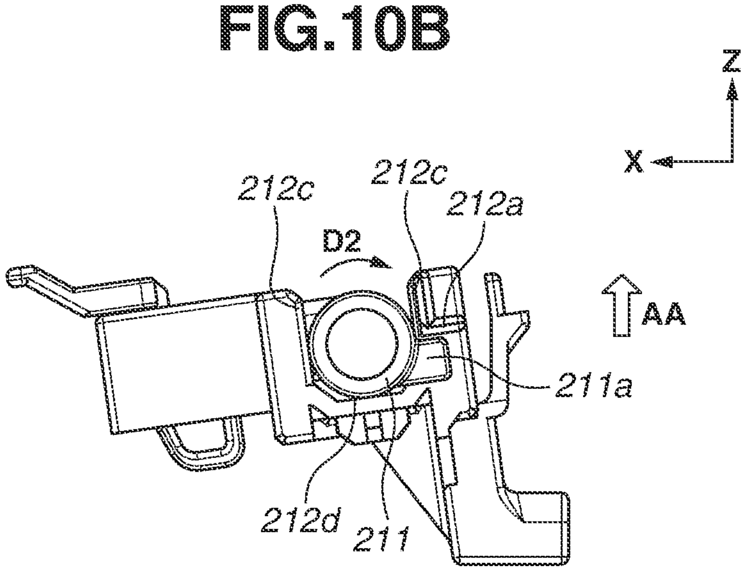

FIG. 10B illustrates a state in which the to-be-contacted portion 211*b* is moved to the second position, and is a schematic view of the supporting member 211 in the second state illustrated in FIG. 10A as seen from the inner side of the image forming apparatus 1. As illustrated in FIG. 10B, the supporting member 211 of the bearing member 21 includes a rib 211*a* (to-abut portion), and the positioning member 212 is provided at a position opposed to the rib 211*a* and includes an opposite portion 212*a* that can be in contact with the rib 211*a*. With the transfer roller 9 and the supporting member 211 attached to the apparatus main body 1, the upward movement of the supporting member 211 in the gravity direction is restrained by the rib 211*a* being in contact with the opposite portion 212*a*.

When the transfer roller 9 is detached, the hook portion 211*c* climbs over the restraining portion 212*b* by an external force created by, for example, a user elastically deforming the to-be-contacted portion 211*b*, and the to-be-contacted portion 211*b* is rotated in an arrow D2 direction opposite to the D1 direction and is moved from the second position to the first position. As a result, the rib 211*a* also is moved in the arrow D2 direction in FIG. 10B to a position where the rib 211*a* is out of contact with the opposite portion 212*a*, where the transfer roller 9 and the supporting member 211 can be pulled up in the arrow AA direction in FIG. 10B with respect to the positioning member 212 and detached.

As described above, when the supporting member 211 is in the second state, i.e., when the to-be-contacted portion 211*b* is positioned at the second position, the supporting member 211 is supported by the positioning member 212, and is prevented from being detached from the frame member 14 due to vibration or a change in the gravity direction. In other words, in the second state, the transfer roller 9 and the supporting member 211 are supported by the positioning member 212, so that the transfer roller 9 is correctly attached to the apparatus main body 1.

The above are the descriptions of the attachment operations of the transfer roller 9 and the process cartridge 6 to the apparatus main body 1.

According to the configuration of the present exemplary embodiment, when a user replaces the transfer roller 9 as the transfer member, the user can complete the attachment of the transfer roller 9 in a state where the transfer roller 9 and the supporting member 211 are not completely attached to the apparatus main body 1, by the attachment of the process cartridge 6.

In other words, even with the supporting member 211 in the first state illustrated in FIG. 5B, the attachment operation of the process cartridge 6 moves the to-be-contacted portion 211*b* to the correct attachment position (second position) illustrated in FIG. 5C, so that the supporting member 211 is brought into the second state. Further, in the second state of the supporting member 211 with the to-be-contacted portion 211*b* moved to the correct attachment position, no point of the supporting member 211 is in contact with the process cartridge 6. With the attachment of the transfer roller 9 completed, the supporting member 211 can only function as the bearing of the transfer roller 9.

In the present exemplary embodiment, as described with reference to FIG. 10A, the supporting member 211 is configured to be rotated in the D1 direction by its own weight after the hook portion 211*c* climbs over the restraining portion 212*b* of the positioning member 212, so that the to-be-contacted portion 211*b* and the restraining portion 212*b* come into contact with each other. Instead of a fall by its own weight, a configuration may be employed in which an urging force by an urging unit that is additionally mounted (not illustrated) rotates the supporting member 211 in the direction of the arrow D1 illustrated in FIG. 10A after the hook portion 211*c* climbs over the restraining portion 212*b* of the positioning member 212.

Further, in the present exemplary embodiment, the operation in which the hook portion 211*c* climbs over the restraining portion **212*b* by the to-be-contacted portion 211*b* being pressed by the to-contact portion 83 of the process cartridge 6 has been described. On the other hand, with the image forming apparatus 1 according to the present exemplary embodiment, the hook portion 211*c* can climb over the restraining portion 212*b* by a user using a hand to press the to-be-contacted portion 211*b* when the process cartridge 6 is not attached to the image forming apparatus 1. In other words, other than the method of pressing the to-be-contacted portion 211*b* by the process cartridge 6, a method of pressing the to-be-contacted portion 211*b* by the user can complete the attachment of the transfer roller 9 and the supporting member 211 to the apparatus main body 1**.

[Door Interlocking Separation Mechanism of Transfer Roller from Photosensitive Drum]

In the present exemplary embodiment, with the process cartridge 6 attached to the apparatus main body 1, the transfer roller 9 is configured to be movable between a contact position where the transfer roller 9 is in contact with the photosensitive drum 8 and a separation position where the transfer roller 9 is separated from the photosensitive drum 8. As illustrated in FIG. 3, the bearing member 21 is urged by a spring **24*a* (second urging member) in the direction indicated by an arrow Fd, and the bearing member 22 is urged by a spring 24*b* (first urging member) in the direction indicated by the arrow Fd (arrow Fd direction). Here, the arrow Fd direction in FIG. 3 is a direction from the transfer roller 9 toward the photosensitive drum 8. The bearing members 21 and 22 are urged by the springs 24*a* and 24*b*, respectively, allowing the transfer roller 9 to be in contact with the photosensitive drum 8**.

In the present exemplary embodiment, when the transfer roller 9 is at the separation position, the operations of attaching the transfer roller 9 to and detaching the transfer roller 9 from the apparatus main body 1 can be performed. In other words, with the transfer roller 9 positioned at the separation position with respect to the photosensitive drum 8, the process cartridge 6 is attached to the apparatus main body 1. At this time, in a case where the to-be-contacted portion **211*b* of the supporting member 211 is at the position where the to-be-contacted portion 211*b* is in contact with the to-contact portion 83, the to-be-contacted portion 211*b* is pushed by the to-contact portion 83 with the movement of the process cartridge 6, so that the to-be-contacted portion 211*b*** is moved from the first position to the second position.

As a result, the attachment of the transfer roller 9 to the apparatus main body 1 can be completed.

When the process cartridge 6 is attached to the apparatus main body 1, the transfer roller 9 positioned at the separation position prevents a member of the process cartridge 6, such as the photosensitive drum 8 arranged at a position closest to the transfer roller 9 from coming into contact with the transfer roller 9. This prevents hindrance of the to-contact portion 83 pushing the to-be-contacted portion **211*b* of the supporting member 211. Further, a contact pressure of the transfer roller 9 against the photosensitive drum 8 prevents an increase in an operating force of a user who is attaching the process cartridge 6. When the attachment of the process cartridge 6 is completed and an image formation is performed, the transfer roller 9 is brought into contact with the photosensitive drum 8 by urging forces of the spring 24*a* and the spring 24*b*** to form the transfer nip N.

As the transfer roller 9 is moved from the separation position to the contact position, the bearing members 21 and 22 are also moved. Specifically, the bearing member 21 and the bearing member 22 are moved in a direction closer to the photosensitive drum 8 as seen in the rotational axis direction of the photosensitive drum 8. In other words, the supporting member 211 shifts from the second state to a third state, and the to-be-contacted portion **211*b* is also moved from the second position to a third position closer to the photosensitive drum 8**.

A configuration in which attachment and detachment operations of the process cartridge 6 and the transfer roller 9 are performed with the transfer roller 9 positioned at the separation position as described above, which is a door interlocking separation mechanism of the transfer roller 9 according to the present exemplary embodiment, will be described with reference to FIGS. 11, 12, 13A to 13C, 14A and 14B, and 15A and 15B. In the present exemplary embodiment, in conjunction with an operation of opening the door 13 (opening and closing member) of the image forming apparatus 1 to attach and detach the process cartridge 6, the urging forces of the springs **24*a* and 24*b* are released, and the bearing members 21 and 22 are moved, so that the transfer roller 9** is moved to the separation position.

Figure 11:
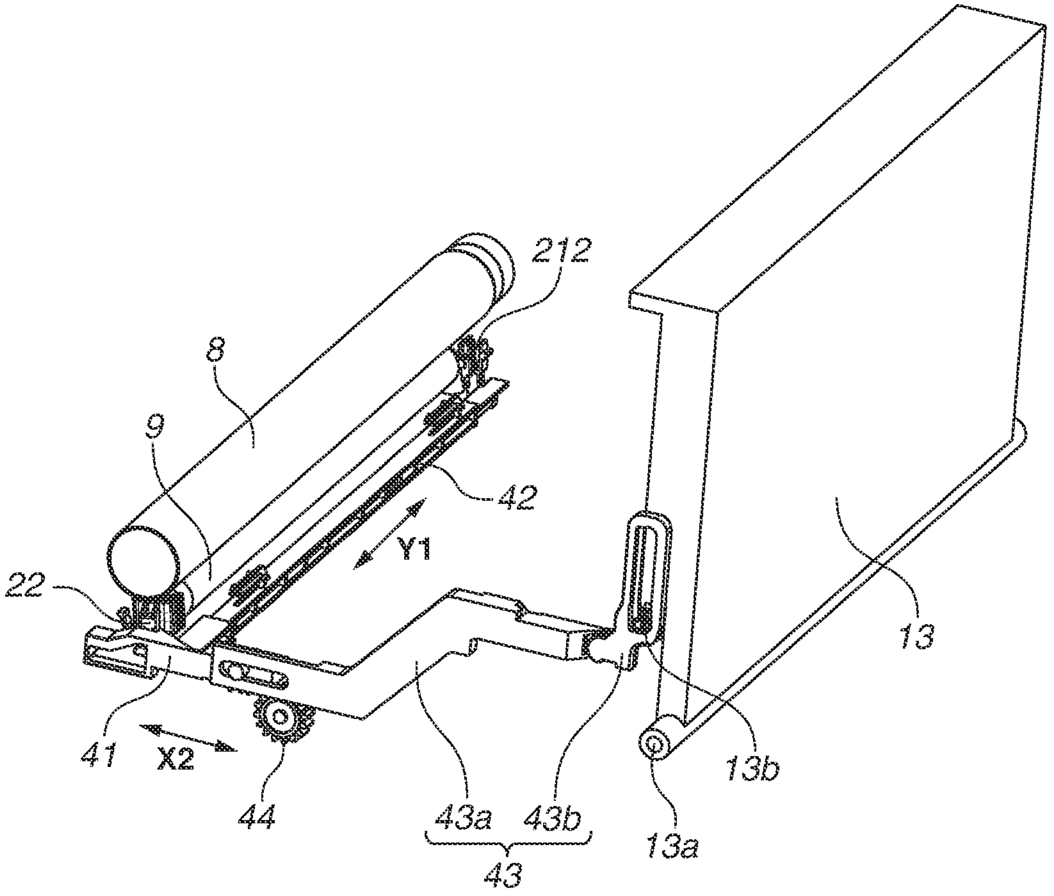
FIG. 11 is a schematic perspective view illustrating a state in which with the transfer member positioned at a contact position, and the door is closed, according to the first exemplary embodiment.
Figure 12:
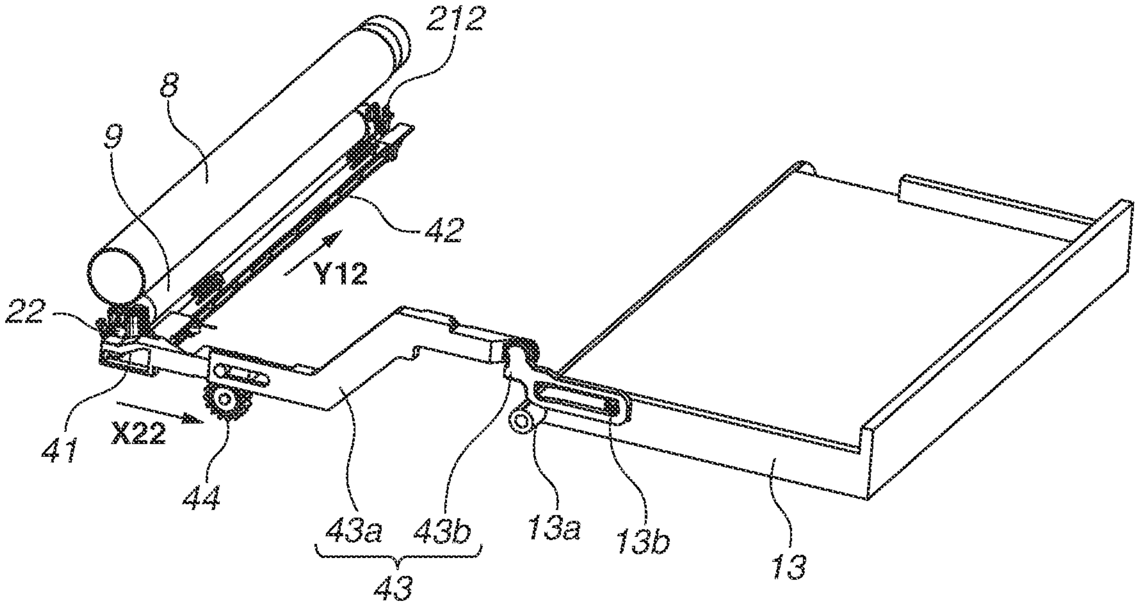
FIG. 12 is a schematic perspective view illustrating a state in which the transfer member is positioned at a separation position, and the door is opened, according to the first exemplary embodiment.

FIG. 11 is a schematic perspective view illustrating a state in which the transfer roller 9 is positioned at the contact position with the door 13 closed. FIG. 12 is a schematic perspective view illustrating a state in which the transfer roller 9 is positioned at the separation position with the door 13 opened. In FIG. 11, the transfer roller 9 is positioned at the contact position by the bearing members 21 and 22 being urged by the springs **24*a* and 24*b*, respectively. In this state, the supporting member 211 is in the third state, and the to-be-contacted portion 211*b*** is positioned at the third position.

Here, as illustrated in FIG. 11, the door interlocking separation mechanism of the transfer roller 9 according to the present exemplary embodiment is composed of a separating lever 41 (first movement member), a separating rod 42 (second movement member), a link member 43 (linking member), and the door 13. The door 13 is supported openable and closable with respect to the frame of the apparatus main body 1 about a rotation shaft **13*a*. An end portion (the other end side) of the separating lever 41 in the rotational axis direction of the photosensitive drum 8 is mounted to a frame member (not illustrated) of the apparatus main body 1, and is supported movable in an arrow X2 direction in FIG. 11. An end portion (the other end side) of the separating rod 42 in the rotational axis direction of the photosensitive drum 8 is mounted to a frame member (not illustrated) of the apparatus main body 1 with the end portion of the separating rod 42 coupled (engaged) with the separating lever 41, and the separating rod 42 is supported movable in an arrow Y1 direction in FIG. 11**.

As illustrated in FIG. 12, as the door 13 is opened, the link member 43 coupled with the door 13 is also moved in a predetermined direction, and the separating lever 41 coupled with the link member 43 is moved in the direction of an arrow X22 by the movement of the link member 43. As the separating lever 41 is moved in the direction of the arrow X22 in FIG. 12, the separating rod 42 configured to be operated in conjunction with the separating lever 41 is moved in the direction of an arrow Y12 in FIG. 12. As a result, the bearing members 21 and 22 are moved, and the transfer roller 9 is moved from the contact position to the separation position against the urging forces of the springs **24*a* and 24*b***.

(Movement Operation of Bearing Member 22)

Figure 13A:
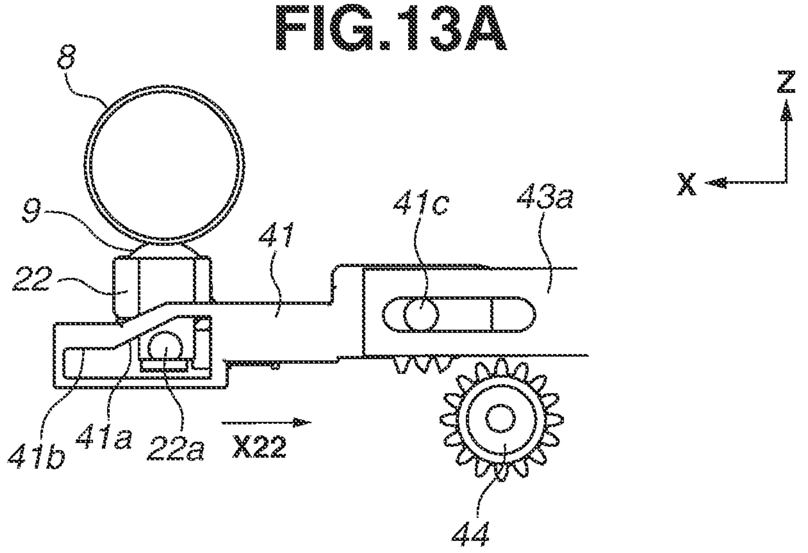
FIGS. 13A to 13C schematically illustrate a separation operation of a bearing member in conjunction with a door opening operation according to the first exemplary embodiment.
Figure 13B:
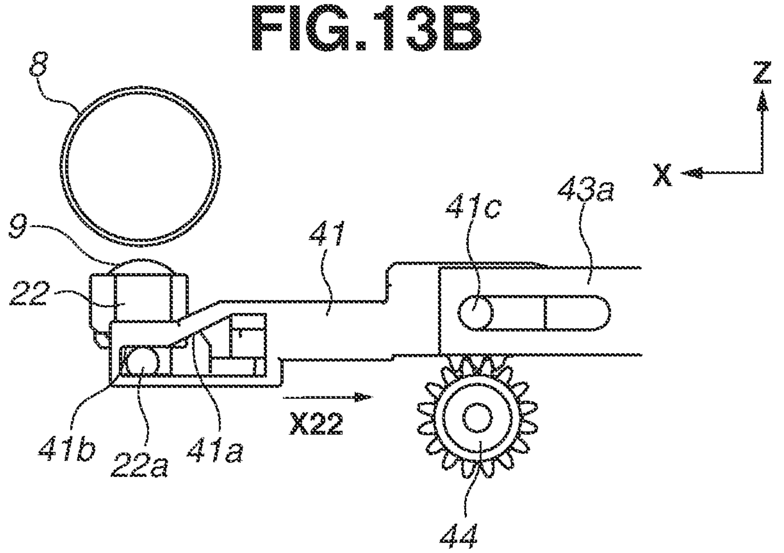
Figure 13C:
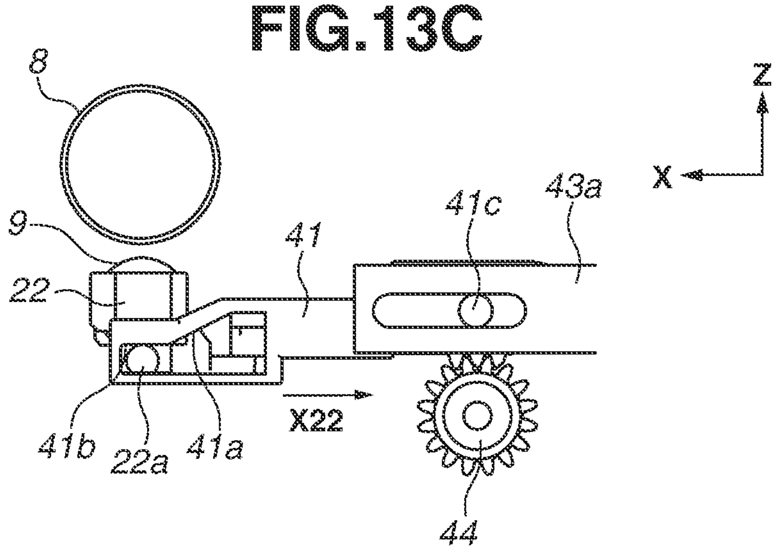

A separation operation of the bearing member 22 by the door interlocking separation mechanism will now be described in detail with reference to FIGS. 13A to 13C. FIGS. 13A to 13C schematically illustrate the separation operation of the bearing member 22 in conjunction with the opening operation of the door 13 as seen in the rotational axis direction of the photosensitive drum 8. FIG. 13A schematically illustrates a state where the transfer roller 9 is positioned at the contact position with the door 13 closed. FIG. 13B schematically illustrates a state where the transfer roller 9 is moved to the separation position by the door 13 being opened. FIG. 13C schematically illustrates a state where the door 13 is closed from the state of FIG. 13B.

As illustrated in FIGS. 13A to 13C, the separating lever 41 includes a slope portion 41*a*, a to-be-abutted portion 41*b*, and an engagement boss 41*c* engageable with a link member 43*a*. An engaging part of the link member 43*a* to be engaged with the engagement boss 41*c* is formed in an oblong hole. When the door 13 in the state of FIG. 13A is opened, the separating lever 41 is moved in the direction of the arrow X22 by the link member 43*a* being moved in conjunction with the door 13. More specifically, the separating lever 41 is moved in the direction of the arrow X22 in FIG. 13A by the engagement boss 41*c* engaged with the oblong hole in the link member 43*a* being pulled in the direction of the arrow X22 in FIG. 13A with the movement of the link member 43*a*. At this time, a boss 22*a* provided on the bearing member 22 and the slope portion 41*a* come in contact with each other, and the boss 22*a* is moved downward in FIG. 13A along the slope portion 41*a*. Thus, the bearing member 22 is pushed down against the urging force of the spring 24*b* urging the bearing member 22 toward the photosensitive drum 8.

When the door 13 is opened and is in the state in FIG. 13B, the boss 22*a* (protruding portion) of the bearing member 22 is moved under the to-be-abutted portion 41*b* of the separating lever 41, so that the position of the bearing member 22 is restricted. At this time, the bearing member 21 also is moved at substantially the same timing by the operation of the separating rod 42, and the position of the transfer roller 9 supported by the bearing members 21 and 22 is restricted at the separation position, which will be described in detail below.

Further, when the door 13 is closed in the separated state in FIG. 13B, as illustrated in FIG. 13C, the link member 43*a* alone in conjunction with the operation of the door 13 is moved in the direction opposite to the direction of the arrow X22 illustrated in FIG. 13C. By driving a separation release gear 44 in this state, the separating lever 41 is moved in the direction opposite to the direction of the arrow X22, and the restriction of the boss 22*a* at the to-be-abutted portion 41*b* is released. The boss 22*a* is then moved to the position illustrated in FIG. 13A along the slope portion 41*a*. As a result, the bearing member 22 is urged by the spring 24*b*. At this time, the bearing member 21 is also moved at substantially the same timing by the operation of the separating rod 42, so that the transfer roller 9 is urged toward the photosensitive drum 8 and moved to the contact position, which will be described in detail below.

(Separation Operation of Bearing Member 21)

Figure 14A:
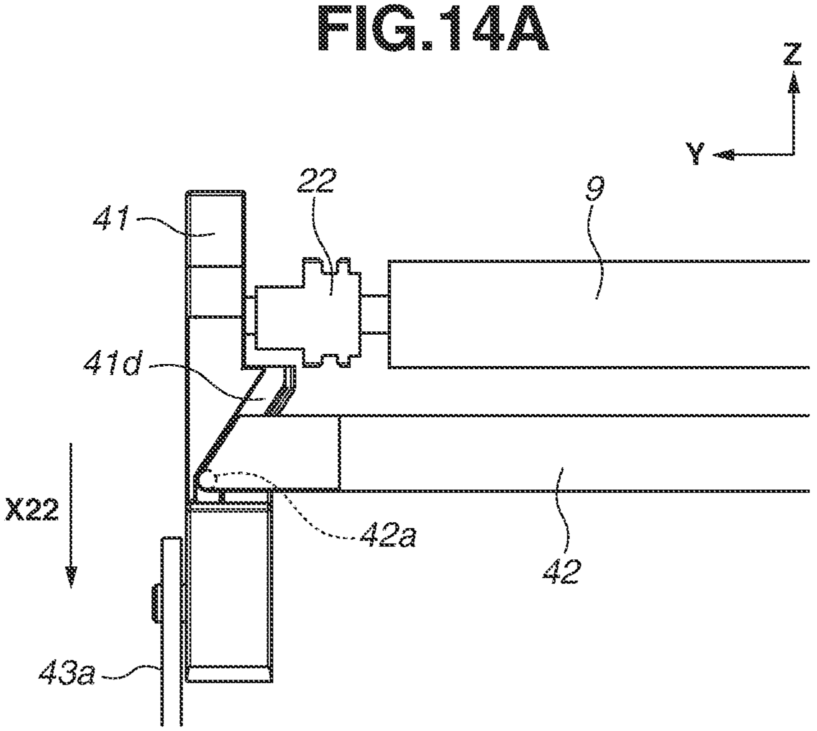
FIGS. 14A and 14B schematically illustrate a link configuration of each member of a door interlocking separation mechanism according to the first exemplary embodiment.
Figure 14B:
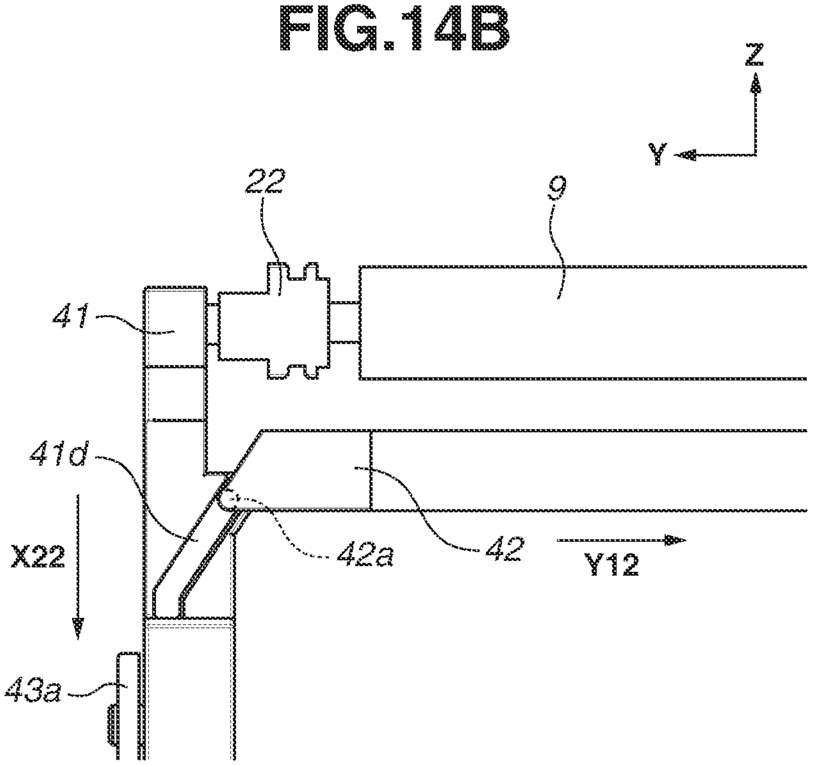

A separation operation of the bearing member 21 by the door interlocking separation mechanism will now be described with reference to FIGS. 14A and 14B, and FIGS. 15A and 15B. FIGS. 14A and 14B schematically illustrate a link configuration of members of the door interlocking separation mechanism. FIG. 14A schematically illustrates positions of the members with the door 13 closed. FIG. 14B schematically illustrates positions of the members with the door 13 opened.

As illustrated in FIGS. 14A and 14B, the separating rod 42 includes an engaging portion 42*a* at an end portion thereof (the other end side on which the bearing member 22 is disposed) in the rotational axis direction of the photosensitive drum 8. The engaging portion 42*a* is engaged with a groove portion 41*d* in the separating lever 41. Thus, as the link member 43*a* is moved by the operation of opening the door 13 and the separating lever 41 is moved in the direction of the arrow X22, the engaging portion 42*a* is moved at the angle of the groove portion 41*d*, so that the separating rod 42 is moved in the direction of the arrow Y12 illustrated in FIG. 14B.

Figure 15A:
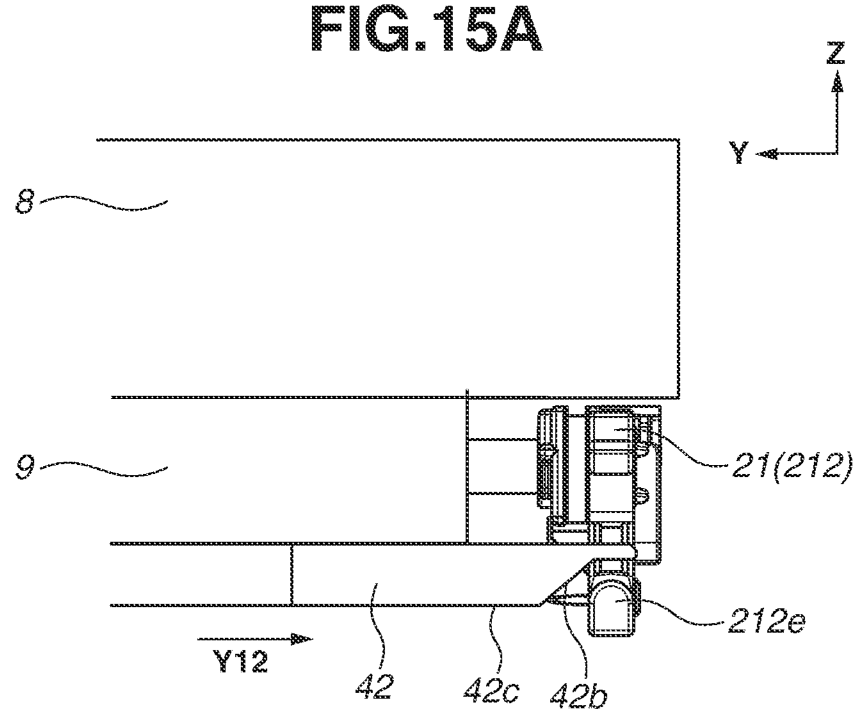
FIGS. 15A and 15B schematically illustrate the separation operation of the bearing member by the door interlocking separation mechanism according to the first exemplary embodiment.
Figure 15B:
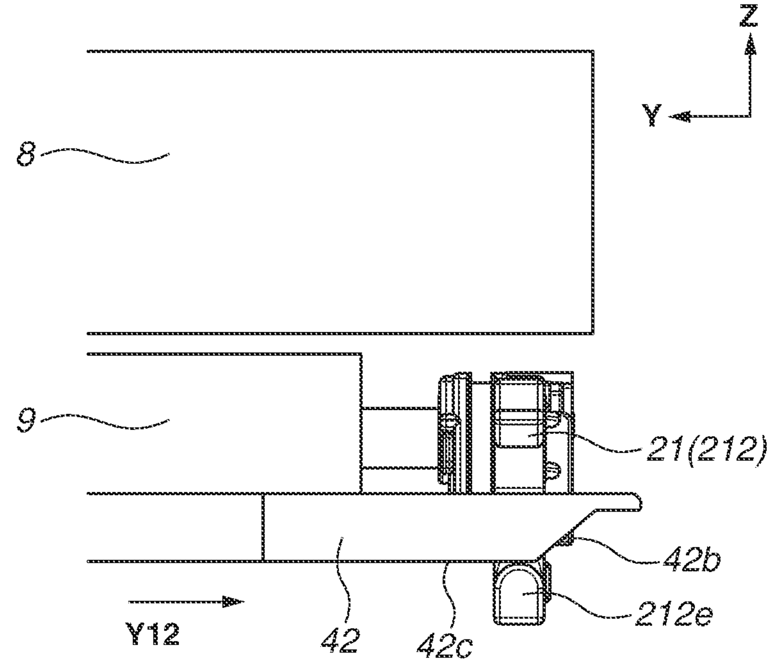

FIGS. 15A and 15B schematically illustrate the separation operation of the bearing member 21 by the separating rod 42 of the door interlocking separation mechanism. FIG. 15A schematically illustrates a relationship between the separating rod 42 and the bearing member 21 when the door 13 is closed and the transfer roller 9 is positioned at the contact position. FIG. 15B schematically illustrates a relationship between the separating rod 42 and the bearing member 21 when the door 13 is opened and the separating rod 42 is moved in the direction of the arrow Y12.

As illustrated in FIGS. 15A and 15B, the positioning member 212 of the bearing member 21 includes a boss 212*e* (protruding portion), and the separating rod 42 includes a slope portion 42*b* at an end portion thereof (the one end side on which the bearing member 21 is disposed) in the rotational axis direction of the photosensitive drum 8. As the link member 43*a* and the separating lever 41 are moved with the opening of the door 13, the separating rod 42 is moved in the direction of the arrow Y12 as described with reference to FIGS. 14A and 14B, and first, the slope portion 42*b* and the boss 212*e* come in contact with each other. With the movement of the separating rod 42 in the direction of the arrow Y12, the boss 212*e* is then pushed downward in FIGS. 15A and 15B along the shape of the slope portion 42*b*.

When the movement of the separating rod 42 is completed, as illustrated in FIG. 15B, the boss 212*e* is brought into contact with a to-be-abutted portion 42*c* of the separating rod 42 and is moved under the to-be-abutted portion 42*c*, so that the boss 212*e* is positioned at a position against the urging force of the spring 24*a*. At this time, since the bearing member 22 is also positioned by the to-be-abutted portion 41*b* after being pushed down in the downward direction in FIG. 15B, the bearing member 21 is moved in the direction away from the photosensitive drum 8 against the urging force of the spring 24*a*, and the bearing member 22 is positioned after being moved in the direction away from the photosensitive drum 8 against the urging force of the spring 24*b*. As a result, the transfer roller 9 is located at the separation position.

Even when the door 13 in the state of FIG. 14B and FIG. 15B is closed, the separating rod 42 is not moved in the direction opposite to the direction of the arrow Y12 in FIG. 15B. In the configuration of the present exemplary embodiment, by driving the separation release gear 44 after the door 13 is closed, the separating lever 41 is moved in the direction opposite to the direction of the arrow X22, and the separating rod 42 is also moved in the direction opposite to the direction of the arrow Y12 accordingly. This releases the restriction of the boss 212*e* by the to-be-abutted portion 42*c*, moving the boss 212*e* to the position illustrated in FIG. 15A along the slope portion 42*b*. At this time, as described above, the bearing member 22 is also moved to the position in FIG. 13A by the movement of the separating lever 41, bringing the bearing member 21 into being urged by the spring 24*a* and the bearing member 22 into being urged by the spring 24*b*, with the transfer roller 9 positioned at the contact position.

As described above, the configuration of the present exemplary embodiment allows the door interlocking separation mechanism to move the transfer roller 9 to the separation position with the opening operation of the door 13. The attachment and the detachment of the transfer roller 9 and the process cartridge 6 are performed through the opening formed by opening the door 13. At this time, since the transfer roller 9 is located at the separation position, the transfer roller 9 and the process cartridge 6 are out of contact with each other when the process cartridge 6 is attached after the transfer roller 9 is attached.

This provides a good operability of the attachment and detachment operation since the process cartridge 6 receives no contact pressure from the transfer roller 9 when the process cartridge 6 is attached.

In the present exemplary embodiment, the operation of opening the door 13 and the separation operation of the transfer roller 9 are interlocked with the link member 43 disposed on one side of the door 13. Alternatively, for example, a configuration may be employed in which link members are disposed on both sides of the door 13. In this case, by providing separation levers on both sides without using the separating rod 42, a similar effect as that of the present exemplary embodiment can be obtained.

Further, in the present exemplary embodiment, the transfer roller 9 is moved to the separation position in conjunction with the opening operation of the door 13, but the transfer roller 9 is not necessarily moved in conjunction with the opening operation of the door 13. For example, a configuration may be employed of detecting a timing at which the process cartridge or the transfer roller is replaced, operating a separation mechanism of the transfer roller 9 using an actuator, and moving the transfer roller 9 to the separation position. Even in this case, the transfer roller is prevented from coming into contact with the process cartridge 6 when the process cartridge is inserted.

[Removing Operation of Transfer Roller]

Figure 16:
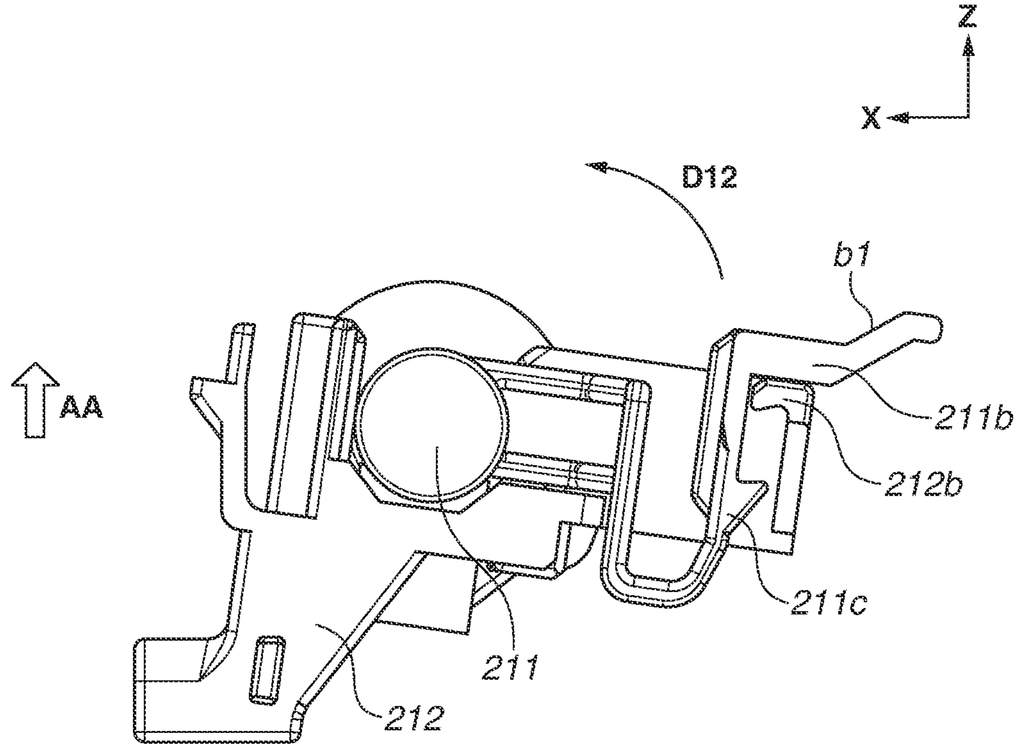
FIG. 16 schematically illustrates detachment of the transfer member according to the first exemplary embodiment.

An operation for detaching the transfer roller 9 from the frame member 14 will now be described with reference to FIG. 16. FIG. 16 schematically illustrates the detachment of the transfer roller 9, and illustrates the transfer roller 9 after the door 13 is opened to move the transfer roller 9 to the separation position, and the process cartridge 6 is detached from the apparatus main body 1.

As illustrated in FIG. 16, the to-be-contacted portion 211*b* of the supporting member 211 has the to-be-contacted surface b1. In the present exemplary embodiment, the normal direction of the to-be-contacted surface b1 is directed to the opening when the process cartridge 6 and the transfer roller 9 are detached from the apparatus main body 1. A user can release the engagement between the hook portion 211*c* and the restraining portion 212*b* by elastically deforming the supporting member 211 by putting a finger or the like on the to-be-contacted portion 211*b* provided with the to-be-contacted surface b1 and rotating the to-be-contacted portion 211*b* in a direction D12 in FIG. 16. In other words, the to-be-contacted portion 211*b* functions as a handle when the user detaches the transfer roller 9. The normal direction of the to-be-contacted surface b1 is directed to the opening, allowing the user to easily access the to-be-contacted portion 211*b* as the handle. Good visibility of the to-be-contacted portion 211*b* from the opening can improve the operability during replacement of the transfer roller 9.

The user grasps the to-be-contacted portion 211*b* as the handle and rotates the supporting member 211 in the direction D12, and after the hook portion 211*c* climbs over the restraining portion 212*b*, the user moves the supporting member 211 in the arrow AA direction in FIG. 16. Through this operation, the transfer roller 9 and the supporting member 211 are detached from the frame member 14. In the present exemplary embodiment, on the other end side of the transfer roller 9, which is the side where the bearing member 22 is disposed, the shaft portion 9*b* of the transfer roller 9 is rotatably supported by the bearing member 22. Thus, grasping the supporting member 211 and lifting the transfer roller 9 from the frame member 14 separates the shaft portion 9*b* from the bearing member 22, and the transfer roller 9 can be detached from the frame member 14.

In the present exemplary embodiment, the bearing member 21 consisting of the supporting member 211 and the positioning member 212 is disposed only on one end side of the transfer roller 9 in the rotational axis direction of the photosensitive drum 8, but the present disclosure is not limited thereto. For example, the bearing member 22 on the other end side may have the same configuration as that of the bearing member 21 on the one end side, and the transfer roller 9 may be detached from the frame member 14 by grasping the supporting members arranged on both sides.

A second exemplary embodiment of the image forming apparatus 1 of the present disclosure will be described with reference to FIGS. 17A and 17B. In the following description, like numbers refer to like components in the first exemplary embodiment, and a redundant description thereof will be omitted. A difference in configuration from the first exemplary embodiment will be described.

Figure 17A:
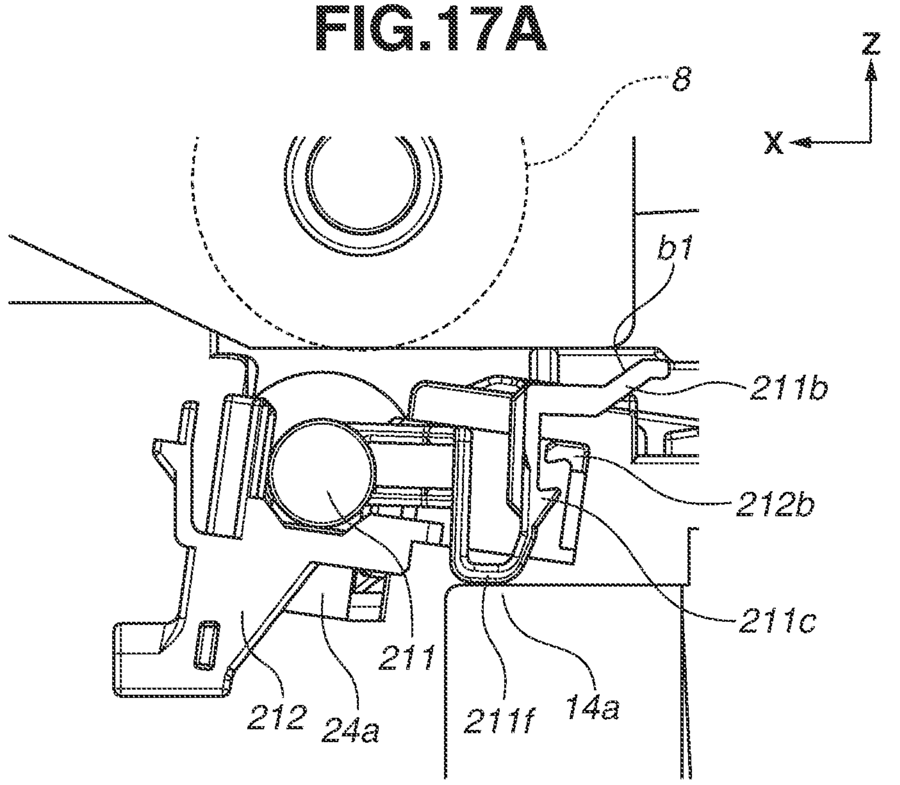
FIG. 17A schematically illustrates a peripheral configuration of the transfer member according to a second exemplary embodiment.
Figure 17B:
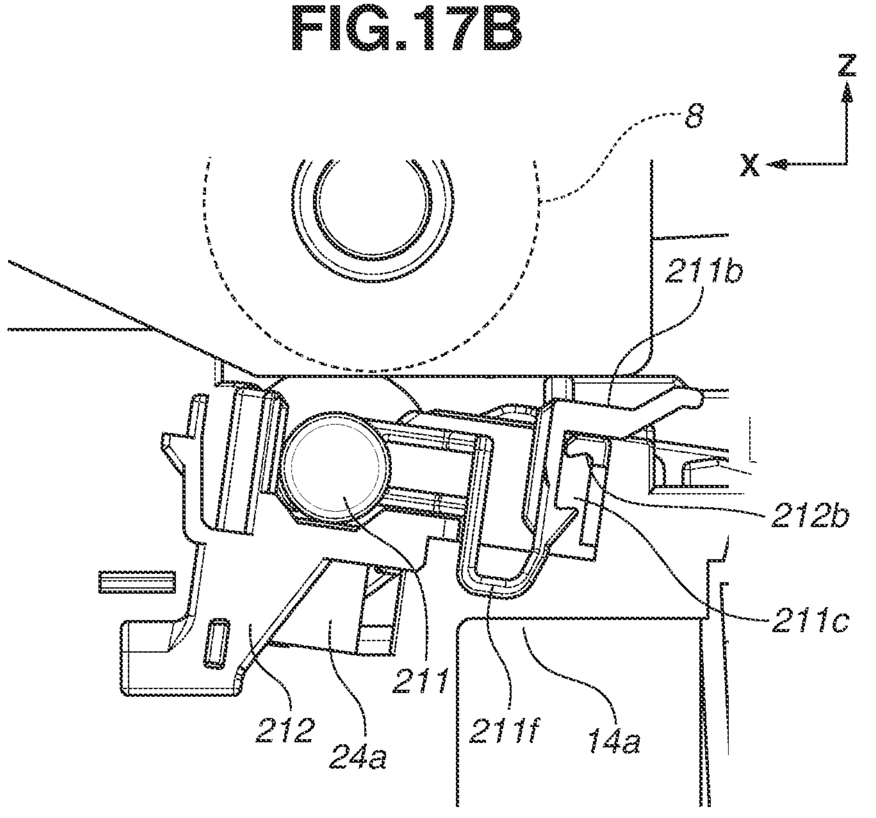
FIG. 17B schematically illustrates a peripheral configuration of the transfer member according to the second exemplary embodiment.

FIGS. 17A and 17B schematically illustrate a peripheral configuration of the transfer roller 9 according to the second exemplary embodiment. FIG. 17A illustrates a state in which the supporting member 211 is in the second state and the to-be-contacted portion 211*b* is at the second position. FIG. 17B illustrates a state in which the transfer roller 9 is positioned at the contact position, the supporting member 211 is in the third state, and the to-be-contacted portion 211*b* is positioned at the third position.

In the present exemplary embodiment, the supporting member 211 includes a to-abut portion 211*f*. The frame member 14 has a to-be-abutted surface 14*a* which a moving member abuts. As illustrated in FIG. 17A, with the transfer roller 9 positioned at the separation position, the to-abut portion 211*f* of the supporting member 211 is in contact with the to-be-abutted surface 14*a* of the frame member 14. At this time, the to-be-contacted portion 211*b* of the supporting member 211 is out of contact with the restraining portion 212*b* of the positioning member 212, and the to-be-contacted portion 211*b* is raised above the positioning member 212. In other words, in the second state in the present exemplary embodiment, the supporting member 211 is in contact with the to-be-abutted surface 14*a* on the frame member 14, and the to-be-contacted portion 211*b* that the user can grasp is separated from the restraining portion 212*b*. Thus, the normal direction of the to-be-contacted surface b1 of the to-be-contacted portion 211*b* is directed to the opening more than that is in the first exemplary embodiment. As a result, the user can more easily grasp the to-be-contacted portion 211*b* in removing the transfer roller 9, providing an improved operability of replacing the transfer roller 9.

As illustrated in FIG. 17B, with the transfer roller 9 moved to the contact position, the positioning member 212 is moved in a direction approaching the photosensitive drum 8 by the urging force of the spring 24*a*, so that the to-abut portion 211*f* of the supporting member 211 and the to-be-abutted surface 14*a* of the frame member 14 are separated from each other. At this time, the to-be-contacted portion

211*b* of the supporting member 211 is in contact with and supported by the restraining portion 212*b* by the movement of the positioning member 212, so that the supporting member 211 is positioned by the positioning member 212. In the present exemplary embodiment, similarly to the first exemplary embodiment, the to-be-contacted portion 211*b* is pressed by the to-contact portion 83 of the process cartridge 6, so that the supporting member 211 can be shifted from the first state to the second state. Further, similarly to the first exemplary embodiment, the to-be-contacted portion 211*b* having the to-be-contacted surface b1 is out of contact with the process cartridge 6 in either of the states illustrated in FIGS. 17A and 17B, in both states of which the attachment of the transfer roller 9 to the apparatus main body 1 is completed.

A third exemplary embodiment of the image forming apparatus 1 of the present disclosure will be described with reference to FIG. 18 and FIGS. 19A to 19C.

In the following description, like numbers refer to like components in the first exemplary embodiment, and a redundant description thereof will be omitted. A difference in configuration from the first exemplary embodiment will be described.

Figure 18:
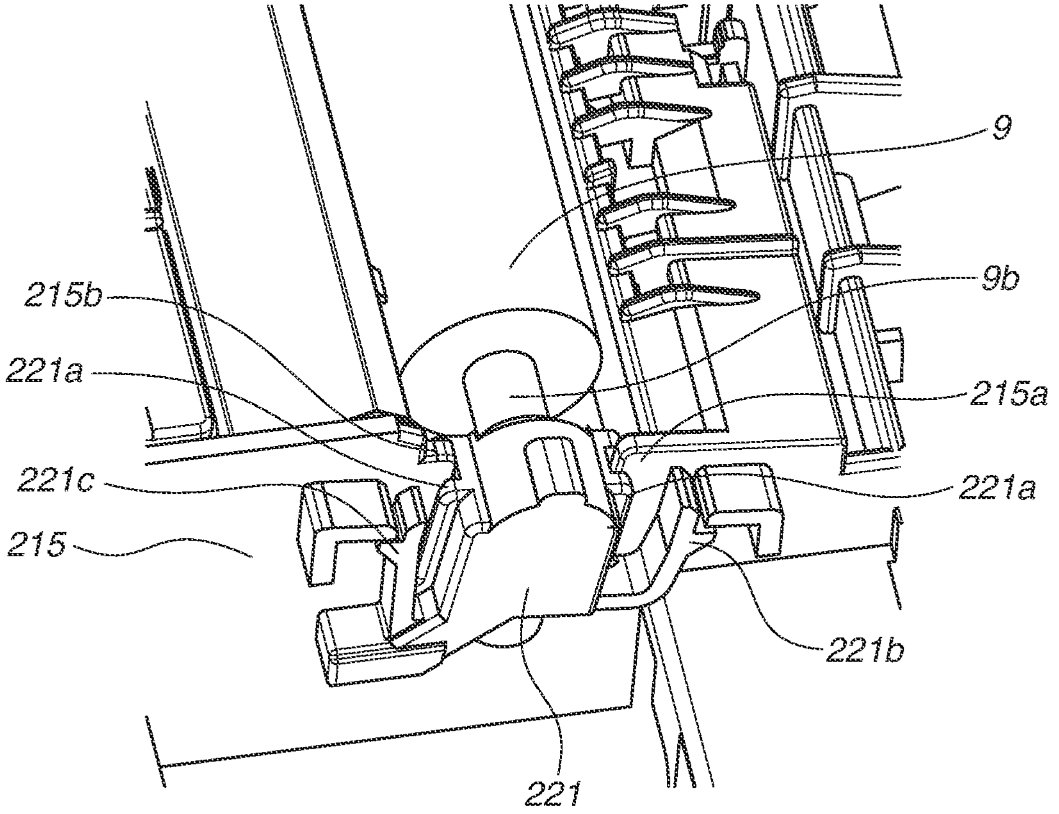
FIG. 18 is a schematic perspective view illustrating a configuration of a bearing member on one end side according to a third exemplary embodiment.

FIG. 18 is a schematic perspective view illustrating a configuration of a bearing member 221 on one end side according to the present exemplary embodiment. As illustrated in FIG. 18, in the present exemplary embodiment, the shaft portion 9*b* of the transfer roller 9 is rotatably supported by the bearing member 221. The bearing member 221 is supported by engagement of the rib 211*a* with a bearing support portion 15*a* of a frame member 215.

Figure 19A:
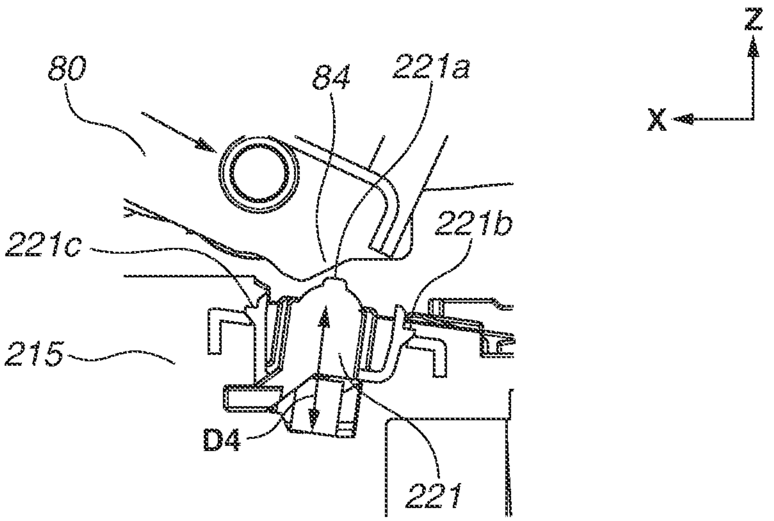
FIGS. 19A to 19C schematically illustrate attachment of the transfer member according to the third exemplary embodiment.
Figure 19B:
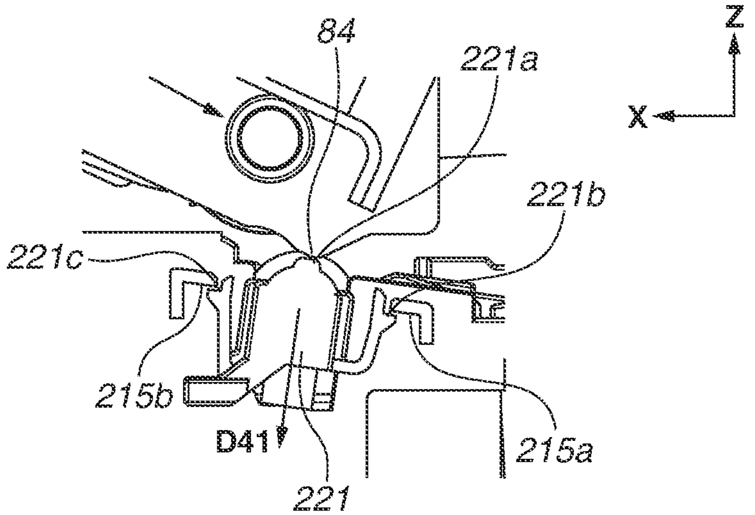
Figure 19C:
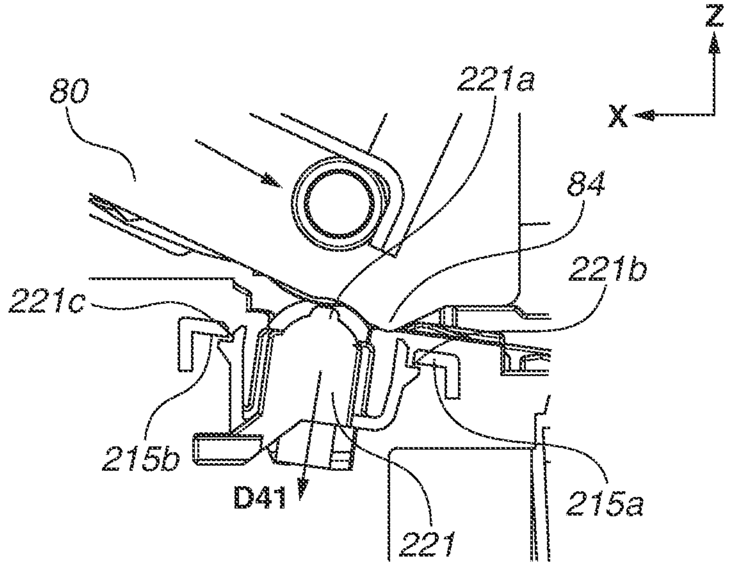

FIG. 19A schematically illustrates a configuration of the bearing member 221 in a first state (first position) according to the present exemplary embodiment. FIG. 19C schematically illustrates a configuration of the bearing member 221 in a second state (second position). FIG. 19B schematically illustrates a configuration of the bearing member 221 that shifts from the first state to the second state with the movement of the process cartridge 6.

As illustrated in FIG. 19A, the bearing member 221 is supported movable in the direction indicated by an arrow D4 with respect to the frame member 215. At the first position, the bearing member 221 is not restricted in the upward direction in FIG. 19A, and thus can be detached easily. The process cartridge 6 includes a to-contact portion 84, and the bearing member 221 includes a to-be-contacted portion 221*a*. As illustrated in FIG. 19B, the to-be-contacted portion 221*a* is pushed in with the attachment of the process cartridge 6, so that the bearing member 221 is moved in the direction of the arrow D4 which is a direction away from the process cartridge 6. Thereafter, a hook portion 221*b* climbs over a restricting portion 215*a*, and a hook portion 221*c* climbs over a restricting portion 215*b*, so that the bearing member 221 is supported by the frame member 215.

FIG. 19C illustrates a state of the second position where the process cartridge 6 is attached to a predetermined position, the bearing member 221 is supported by the frame member 215, and the to-be-contacted portion 221*a* is out of contact with the to-contact portion 84. With the configuration according to the present exemplary embodiment, similarly to the first exemplary embodiment, when a user attaches a transfer member in replacing transfer members, an operation of attaching the process cartridge 6 allows the bearing member 221 positioned at an inappropriate attachment position to be moved to the correct attachment position. Further, after the process cartridge 6 is moved to the correct attachment position, the bearing member 221 is out of contact with the process cartridge 6 and can function as the bearing for the transfer roller 9.

In the first to third exemplary embodiments, a monochrome laser printer is exemplified as the image forming apparatus 1, and the image bearing member unit is the process cartridge 6 including the photosensitive drum 8. However, the present disclosure is not limited thereto.

For example, the image bearing member unit may be an intermediate transfer unit in a color laser printer. In this case, the image bearing member is an intermediary transfer member for carrying a toner image transferred from a photosensitive drum, and the transfer member may be a transfer roller as a secondary transfer member. Further, the image bearing member unit is not limited to a unit in which a developing unit including a developing member and a developer is integrated with the image bearing member unit as described in the present exemplary embodiments. For example, a developing unit separate from the image bearing member unit may be used. In any case, a configuration in which a transfer member can be attached to the apparatus main body by an attachment operation of a unit attachable to and detachable from the apparatus main body can have the above-described effects by employing any configuration of the first to third exemplary embodiments.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-133796, filed Aug. 25, 2022, which is hereby incorporated by reference herein in its entirety.

What is claimed is:

1. An image forming apparatus comprising:

an apparatus main body;

an image bearing member unit disposed attachable to and detachable from the apparatus main body and including an image bearing member for bearing a toner image;

a transfer member disposed attachable to and detachable from the apparatus main body and configured to transfer the toner image borne on the image bearing member onto a recording material;

a supporting member disposed at one end side of a shaft portion of the transfer member in an axial direction of the transfer member and configured to rotatably support the shaft portion of the transfer member, wherein the supporting member includes a to-be-contacted portion configured to be in contact with a to-contact portion of the image bearing member unit; and a positioning member configured to position the supporting member with respect to the apparatus main body, wherein the to-be-contacted portion is movable from a first position to a second position by an attachment operation of the image bearing member unit to the apparatus main body, where the first position is a position to be in contact with the to-contact portion, the second position is a position different from the first position, and the second position is a position at which the supporting member is supported by the positioning member and the to-be-contacted portion is out of contact with the to-contact portion.

2. The image forming apparatus according to claim 1, further comprising an urging member configured to urge the transfer member toward the image bearing member by urging the positioning member with the image bearing member unit attached to the apparatus main body, wherein the transfer member is configured to be movable between a contact position where the transfer member is in contact with the image bearing member and a separation position where the transfer member is separated from the image bearing member, and wherein with the transfer member positioned at the separation position, the image bearing member unit and the transfer member are detachable from the apparatus main body.

3. The image forming apparatus according to claim 2, further comprising a frame member disposed on the apparatus main body, wherein the supporting member includes a to-abut portion to abut the frame member, and the to-abut portion is in contact with the frame member with the to-be-contacted portion positioned at the second position.

4. The image forming apparatus according to claim 3, wherein, in a case where the transfer member is moved from the separation position to the contact position, the to-be-contacted portion is movable from the second position toward a third position that is a position closer to the image bearing member than the second position, and, wherein, with the to-be-contacted portion positioned at the third position, the to-abut portion is separated from the frame member.

5. The image forming apparatus according to claim 2, further comprising:

a door supported openable and closable with respect to the apparatus main body; and a separation mechanism configured to move the transfer member to the separation position in conjunction with an operation of opening the door, wherein the image bearing member unit is detachable through an opening formed when the door is opened.

6. The image forming apparatus according to claim 5, wherein the separation mechanism includes:

a first moving member disposed at another end side of the shaft portion opposite to the one end side of the shaft portion in the axial direction, a link member configured to couple the first moving member and the door with each other, and a second moving member configured to be coupled with the first moving member on the other end side and movable in the axial direction, wherein the first moving member is moved in a direction orthogonal to the axial direction by the operation of opening the door, and the second moving member is moved in the axial direction by a movement of the first moving member.

7. The image forming apparatus according to claim 6, further comprising:

a bearing member disposed on the other end side of the shaft portion in the axial direction and rotatably supporting the shaft portion;

a first urging member configured to urge the bearing member in a direction toward the image bearing member; and a second urging member configured to urge the positioning member in the direction toward the image bearing member, wherein the transfer member is moved to the separation position by the movement of the first moving member moving the bearing member against an urging force of the first urging member and by a movement of the second moving member moving the positioning member against an urging force of the second urging member.

8. The image forming apparatus according to claim 1, wherein the supporting member and the positioning member are also disposed on another end side opposite to the one end side of the shaft portion in the axial direction.

9. The image forming apparatus according to claim 1, wherein the image bearing member is a photosensitive drum.

10. The image forming apparatus according to claim 9, wherein the image bearing member unit is a unit including the photosensitive drum and a developing member configured to develop an electrostatic latent image on the photosensitive drum with toner.

11. The image forming apparatus according to claim 1, further comprising:

a photosensitive drum configured to bear the toner image; and a developing member configured to develop an electrostatic latent image on the photosensitive drum with toner, wherein the image bearing member is an intermediate transfer member configured to bear the toner image transferred from the photosensitive drum, and wherein the image bearing member unit is an intermediate transfer unit including the intermediate transfer member.

* * * * *